(12) United States Patent
McEvoy et al.

(10) Patent No.: US 9,759,240 B2
(45) Date of Patent: *Sep. 12, 2017

(54) NO-BOLT SECURITY LATCHING SYSTEM

(71) Applicant: GE Oil & Gas Pressure Control LP, Houston, TX (US)

(72) Inventors: Travis Kyle McEvoy, Houston, TX (US); Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/949,324

(22) Filed: Nov. 23, 2015

(65) Prior Publication Data

US 2016/0102765 A1    Apr. 14, 2016

(51) Int. Cl.
*F15B 15/14*    (2006.01)
*F15B 15/10*    (2006.01)
(Continued)

(52) U.S. Cl.
CPC .......... *F15B 15/10* (2013.01); *F15B 15/1438* (2013.01); *F16K 27/00* (2013.01);
(Continued)

(58) Field of Classification Search
CPC ......... Y10T 137/7043; Y10T 137/7069; Y10T 137/7131; Y10T 137/7256;
(Continued)

(56) References Cited

U.S. PATENT DOCUMENTS 2,610,820 A    9/1952  Markel
2,953,166 A    9/1960  Carlson, Jr.
(Continued)

FOREIGN PATENT DOCUMENTS

CN    2121592 U    11/1992
CN    101093034 A    12/2007
(Continued)

OTHER PUBLICATIONS

U.S. Appl. No. 14/673,178, filed Mar. 30, 2015, Adams et al.
(Continued)

*Primary Examiner* — Matthew W Jellett
(74) *Attorney, Agent, or Firm* — Hogan Lovells US LLP

(57) ABSTRACT

A system for securing a valve actuator to body of a valve assembly includes an actuator housing having housing lugs protruding radially to define a plurality of housing slots therebetween. A bonnet has bonnet lugs protruding radially to define a plurality of bonnet slots therebetween. Each of the housing lugs are sized to pass axially through a respective one of the bonnet slots when the actuator housing is in a released position and, after passing through the bonnet slots, the actuator housing is rotatable to a locked position where at least a portion of one or more of the housing lugs is axially aligned with a portion of a respective bonnet lug to prevent axial movement of the actuator housing, the actuator housing rotating less than one full revolution between the released and locked positions. A securing mechanism prevents relative rotation between the actuator housing and the bonnet.

26 Claims, 12 Drawing Sheets

(51) Int. Cl.
*F16K 31/122* (2006.01)
*F16K 31/126* (2006.01)
*F16K 35/06* (2006.01)
*F16K 35/08* (2006.01)
*F16K 27/00* (2006.01)

(52) U.S. Cl.
CPC ...... *F16K 31/1221* (2013.01); *F16K 31/1262* (2013.01); *F16K 35/06* (2013.01); *F16K 35/08* (2013.01); *Y10T 137/6065* (2015.04)

(58) Field of Classification Search
CPC ......... Y10T 137/7062; Y10T 137/7225; Y10T 70/5637; Y10T 70/5628; Y10T 70/5624; F16K 31/126; F16K 7/17; F16K 7/16; F16K 31/1262; F16K 31/122; F16K 31/1221; F16K 31/1223; F16K 31/1225; F16K 31/1226; F16K 31/1228; F16K 31/124; F16K 31/1245; F16K 27/12
See application file for complete search history.

(56) References Cited

U.S. PATENT DOCUMENTS

| | | |
|---|---|---|
| 3,082,792 A | 3/1963 | Jenkins |
| 3,115,068 A | 12/1963 | Lofink |
| 3,139,898 A | 7/1964 | Wiltgen |
| 3,146,682 A | 9/1964 | Price et al. |
| 3,175,473 A | 3/1965 | Boteler et al. |
| 3,293,992 A | 12/1966 | Baumann |
| 3,380,470 A | 4/1968 | Culpepper, Jr. et al. |
| 3,593,959 A | 7/1971 | Greene |
| 3,792,717 A | 2/1974 | Tibbals |
| 3,811,457 A | 5/1974 | Crossman |
| 3,882,400 A | 5/1975 | Lewis |
| 3,958,592 A | 5/1976 | Wells |
| 3,993,284 A | 11/1976 | Lukens, Jr. |
| 4,135,546 A | 1/1979 | Morrison |
| 4,135,547 A | 1/1979 | Akkerman |
| 4,187,764 A | 2/1980 | Cho |
| 4,274,432 A | 6/1981 | Tunstall et al. |
| 4,309,022 A | 1/1982 | Reinicke et al. |
| 4,354,425 A | 10/1982 | Bruton et al. |
| 4,424,738 A | 1/1984 | Leighton |
| 4,438,793 A * | 3/1984 | Brown ................. B64D 39/06 141/346 |
| 4,480,811 A | 11/1984 | Card et al. |
| 4,489,756 A | 12/1984 | Balz |
| 4,491,060 A | 1/1985 | Boski |
| 4,527,769 A | 7/1985 | Stogner et al. |
| 4,529,330 A | 7/1985 | Boski |
| 4,585,207 A | 4/1986 | Shelton |
| 4,620,562 A | 11/1986 | Pacht |
| 4,624,442 A | 11/1986 | Duffy et al. |
| 4,633,898 A | 1/1987 | Denk |
| 4,650,151 A | 3/1987 | McIntyre |
| 4,691,942 A * | 9/1987 | Ford ................. F16L 37/18 285/312 |
| 4,721,284 A | 1/1988 | Bankard |
| 4,768,545 A | 9/1988 | Hoffman |
| 4,871,143 A | 10/1989 | Baker |
| 4,934,403 A | 6/1990 | Mooney et al. |
| 4,967,785 A | 11/1990 | Young |
| 5,067,392 A | 11/1991 | Gautier |
| 5,294,090 A | 3/1994 | Winnike |
| 5,464,040 A | 11/1995 | Johnson |
| 5,499,648 A | 3/1996 | Powell et al. |
| 5,673,897 A * | 10/1997 | Crochet ............. F16K 31/1221 105/377.07 |
| 5,924,672 A * | 7/1999 | Crochet ............. F16K 31/1221 105/377.07 |
| 5,964,446 A | 10/1999 | Walton et al. |
| 6,015,134 A | 1/2000 | Johnson |
| 6,041,813 A * | 3/2000 | Koch ................. E05B 13/00 137/383 |
| 6,050,541 A | 4/2000 | Chatufale |
| 6,086,039 A | 7/2000 | Sievers et al. |
| 6,089,531 A | 7/2000 | Young |
| 6,397,892 B1 | 6/2002 | Pyle et al. |
| 6,487,960 B1 | 12/2002 | Chatufale |
| 6,672,331 B2 | 1/2004 | Heald |
| 6,854,704 B1 | 2/2005 | Young |
| 7,124,774 B2 | 10/2006 | Weingarten |
| 7,159,839 B2 | 1/2007 | Tanikawa et al. |
| 7,647,861 B2 | 1/2010 | Bessman |
| 8,282,070 B2 | 10/2012 | Davies, Jr. |
| 8,322,359 B2 | 12/2012 | Zecchi et al. |
| 8,708,309 B2 | 4/2014 | Roper et al. |
| 8,864,102 B2 | 10/2014 | Gamache |
| 9,033,308 B2 | 5/2015 | Kiesbauer et al. |
| 9,212,758 B2 | 12/2015 | Adams et al. |
| 2003/0034465 A1 | 2/2003 | Adams et al. |
| 2004/0007682 A1 | 1/2004 | Kajitani |
| 2004/0021102 A1 * | 2/2004 | Berckenhoff ......... E21B 33/063 251/1.1 |
| 2004/0035776 A1 * | 2/2004 | Coleman ................ B01D 35/02 210/232 |
| 2004/0154467 A1 | 8/2004 | Engle et al. |
| 2005/0087712 A1 | 4/2005 | Lymberopoulos |
| 2007/0290154 A1 | 12/2007 | Aoyama |
| 2011/0042604 A1 * | 2/2011 | Jens ................. F16K 27/02 251/324 |
| 2011/0240126 A1 | 10/2011 | Lymberopoulos et al. |
| 2012/0227983 A1 | 9/2012 | Lymberopoulos et al. |
| 2012/0318388 A1 | 12/2012 | Du |
| 2014/0138564 A1 | 5/2014 | Adams et al. |
| 2014/0174554 A1 | 6/2014 | Meyberg et al. |
| 2015/0204456 A1 | 7/2015 | Adams et al. |

FOREIGN PATENT DOCUMENTS

| | | |
|---|---|---|
| CN | 202302237 U | 7/2012 |
| CN | 202432085 U | 9/2012 |
| DE | 102011015646 A1 | 10/2012 |
| EP | 0416966 A2 | 3/1991 |
| EP | 0486824 A1 | 5/1992 |
| FR | 1195213 A | 11/1959 |
| GB | 1148817 A | 4/1969 |
| GB | 2022704 A | 12/1979 |
| GB | 2168787 A | 6/1986 |
| GB | 2303199 A | 2/1997 |
| JP | 2008069795 A | 3/2008 |
| JP | 2010048271 A | 3/2010 |
| WO | 2014099505 A1 | 6/2014 |

OTHER PUBLICATIONS

U.S. Appl. No. 62/172,544, filed Jun. 8, 2015, McEvoy et al.
U.S. Appl. No. 15/175,122, filed Jun. 7, 2016, McEvoy et al.
U.S. Appl. No. 61/747,479, filed Dec. 31, 2012, Adams et al.
U.S. Appl. No. 13/832,884, filed Mar. 15, 2013, Adams et al.
U.S. Appl. No. 13/679,553, filed Nov. 16, 2012, Adams et al.
U.S. Appl. No. 61/747,753, filed Dec. 31, 2012, Adams et al.
U.S. Appl. No. 14/107,589, filed Dec. 16, 2013, Adams et al.
U.S. Appl. No. 62/049,539, filed Sep. 12, 2014, Cheatham et al.
U.S. Appl. No. 13/717,073, filed Dec. 17, 2012, Adams et al.
PCT Search Report and Written Opinion for related application PCT/US2013/077412 dated Mar. 7, 2014.
Actuators Pressure Control CHA Top Access Standard Hydraulic Actuator, GE Oil & Gas, 2013.
International Search Report and Written Opinion issued in connection with related PCT Application No. PCT/US2013/067666, dated Mar. 3, 2014.
International Search Report and Written Opinion issued in connection with related PCT Application No. PCT/US13/077392, dated Mar. 7, 2014.
Non-Final Rejection towards related U.S. Appl. No. 13/679,553 dated Mar. 28, 2014.
International Search Report and Written Opinion issued in connection with related PCT Application No. PCT/US2013/074223 dated Apr. 3, 2014.

(56) References Cited

OTHER PUBLICATIONS

Non-Final Rejection towards related U.S. Appl. No. 13/717,073 dated Jul. 31, 2014.
Non-Final Rejection towards related U.S. Appl. No. 14/107,589 dated Aug. 13, 2014.
Final Rejection towards related application U.S. Appl. No. 13/679,553 dated Oct. 17, 2014.
Non-Final Rejection towards related U.S. Appl. No. 14/673,178 dated Jul. 30, 2015.
International Search Report and Written Opinion issued in connection with related PCT Application No. PCT/US2015/49556, dated Nov. 19, 2015.
Actuators NoBolt™ Dual Seal Pneumatic Actuator, GE Oil & Gas, 2015.
Office Action issued in connection with related CN Application No. 201380070284.5 on May 25, 2016.
Office Action issued in connection with related CN Application No. 201380074076.2 on Jun. 30, 2016.
Office Action issued in connection with related CN Application No. 201380070678.0 on Jul. 5, 2016.
Non-Final Rejection towards related U.S. Appl. No. 14/673,178 dated Jul. 15, 2016.
Notice of Allowance in related U.S. Appl. No. 13/679,553 mailed Nov. 28, 2014.

* cited by examiner

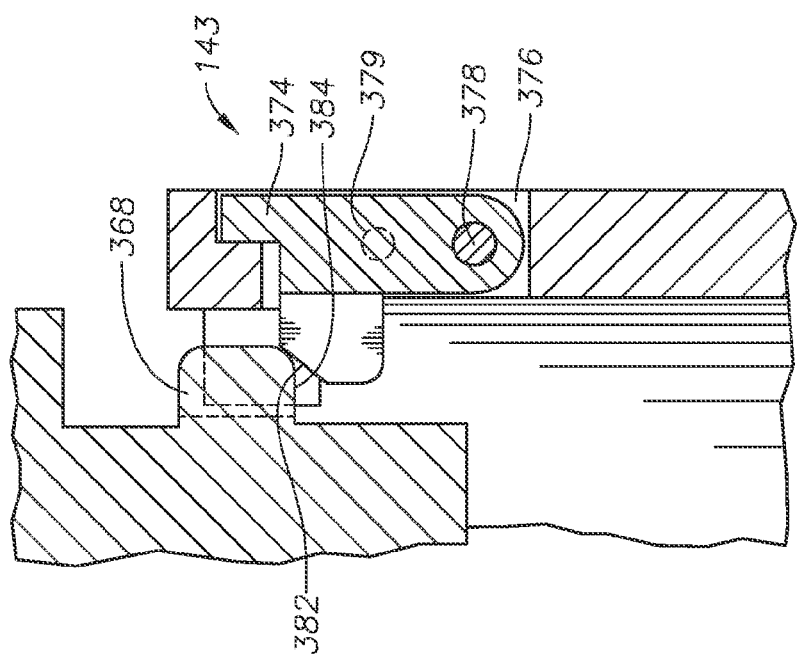
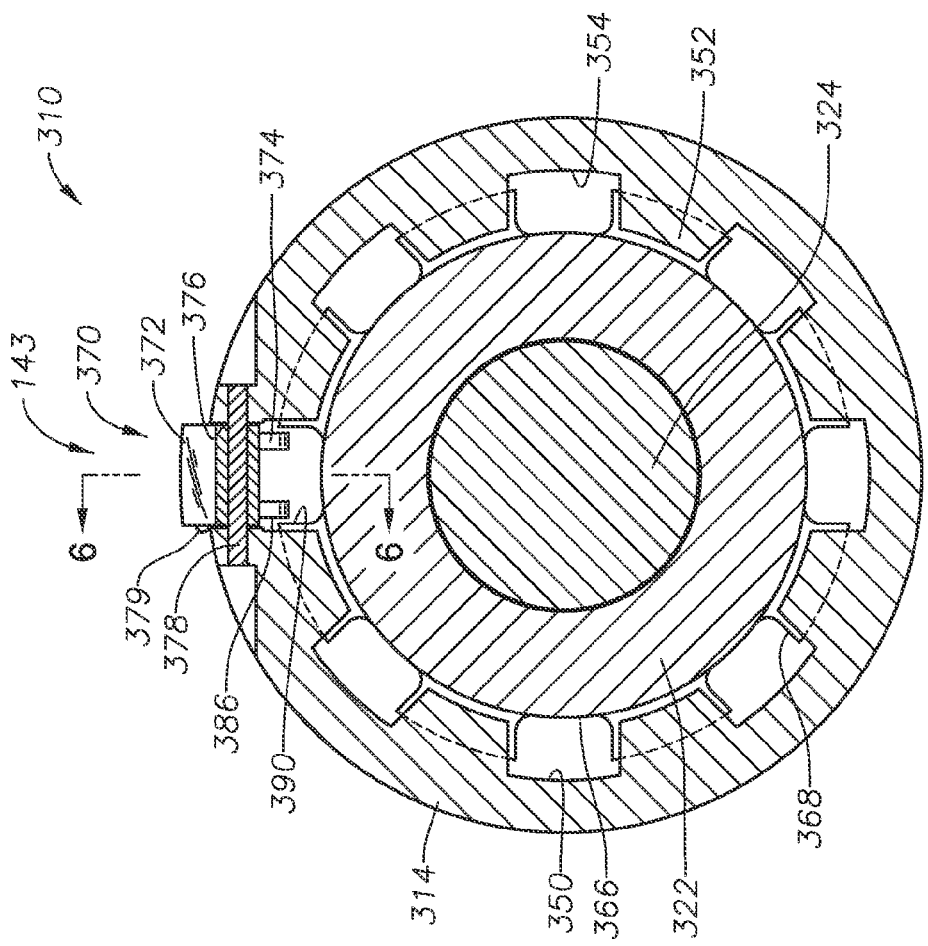
FIG. 6
FIG. 5

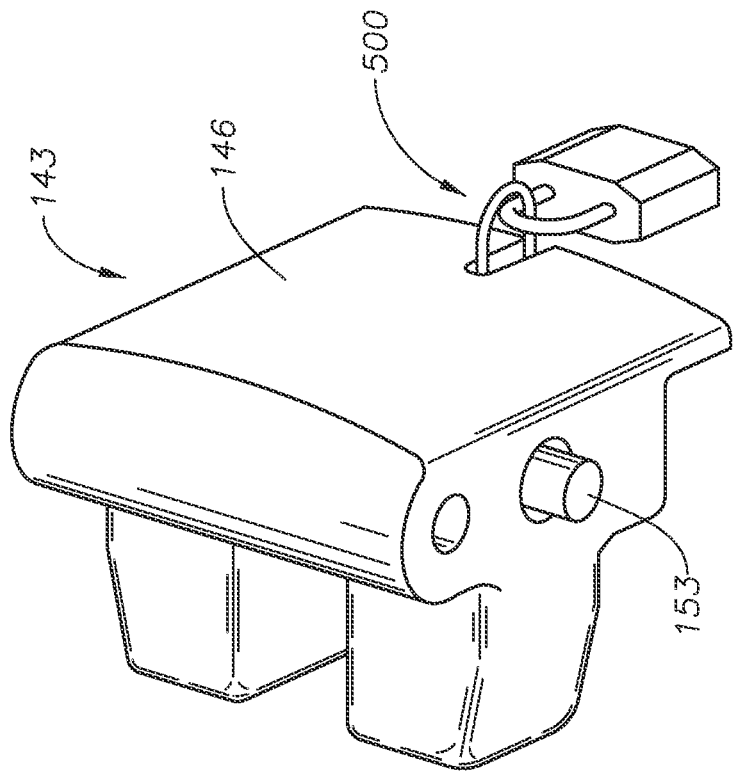
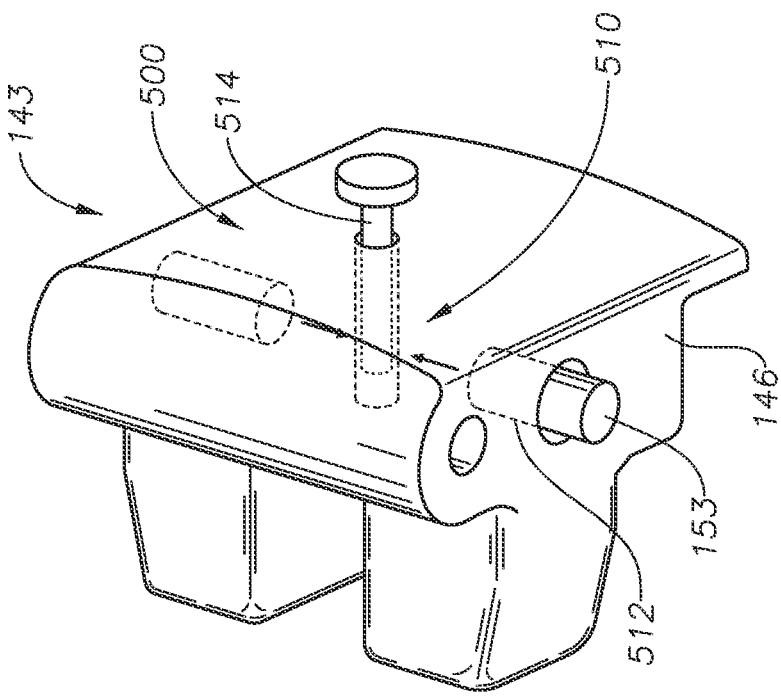
FIG. 8C
FIG. 8D

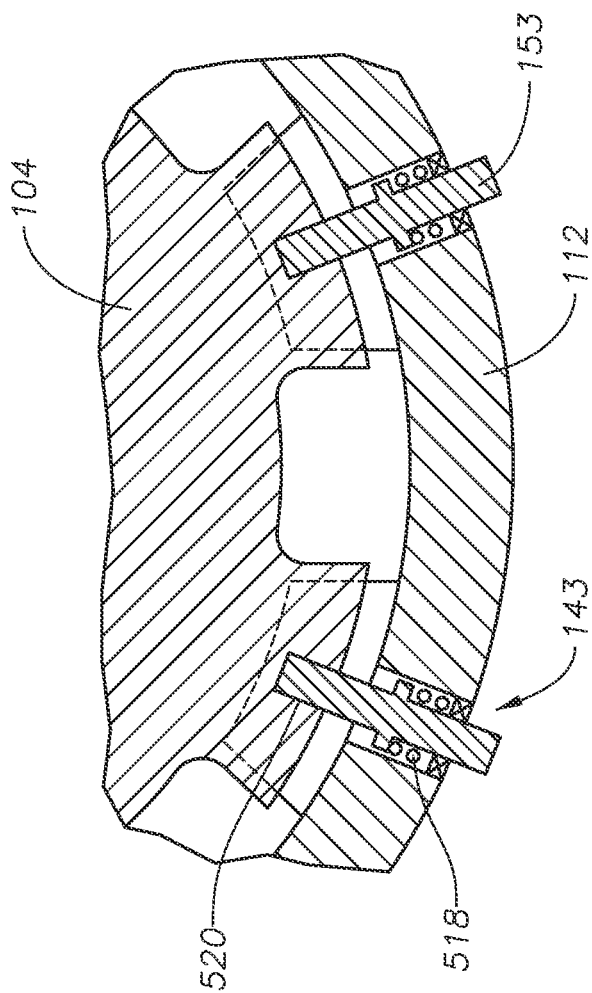
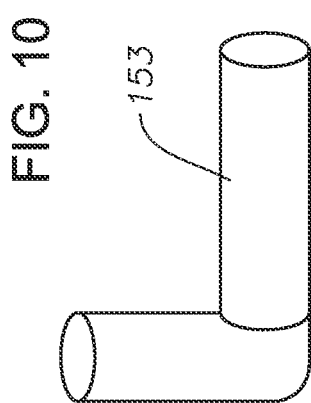
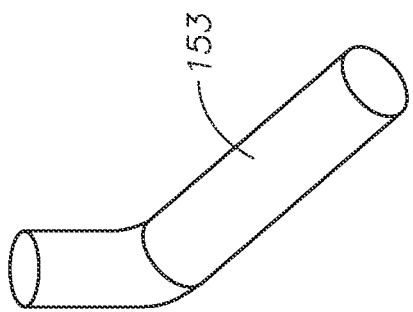

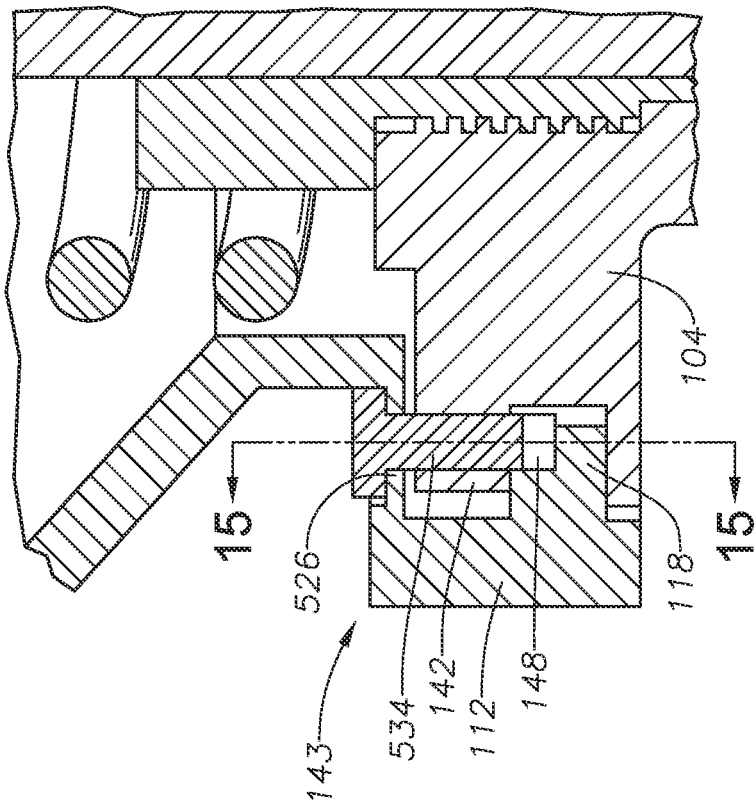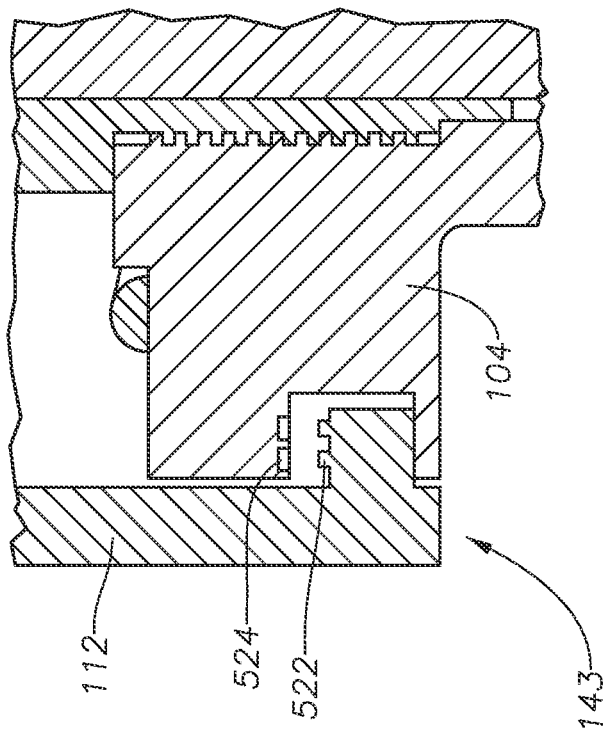

NO-BOLT SECURITY LATCHING SYSTEM

CROSS REFERENCE TO RELATED APPLICATIONS

This application is a continuation in part of U.S. application Ser. No. 13/832,884, now U.S. Pat. No. 9,212,758 titled "Quick Connect Valve Actuator," filed Mar. 15, 2013, which claims priority to U.S. Provisional Patent Application No. 61/747,479 titled "Quick Connect Valve Actuator," filed on Dec. 31, 2012, the disclosure of each which is incorporated herein by reference in its entirety.

BACKGROUND OF THE DISCLOSURE

1. Field of the Disclosure

The present disclosure relates in general to valves for mineral recovery wells, and in particular to actuators to actuate valves.

2. Brief Description of Related Art

Valves used in hydrocarbon drilling and production operations can be actuated by a valve actuator. The valve actuator can be a pneumatic, piston, or hydraulic type actuator that moves a stem linearly or rotationally, or both linearly and rotationally, to open or close the valve.

A bonnet is connected to the valve, with the stem extending through the bonnet, and then the actuator is connected to the bonnet. Valve actuators are often connected to the bonnet by threaded connections or by bolts through a flange. Threads are expensive to manufacture and are easily damaged. Threaded connections also have the disadvantage that the inlet of the actuator rotates about the axis of the actuator during installation. If the actuator is fully tightened and the inlet ends up in the wrong location, the operating supply line to the inlet must be moved. Machining bolt holes in the actuator and drilling and tapping holes into an adapter ring or the bonnet is expensive. In addition, bolts can be easily tampered with, leading to safety concerns and a risk of theft.

SUMMARY OF THE DISCLOSURE

This application discloses embodiments of a valve actuator having a housing with a quick connect apparatus for connecting to a body of the valve assembly. For example, the housing can be connected with a quick connect system to a bonnet, a piston head assembly, or both a mating bonnet and a mating piston head assembly. In various embodiments, the valve actuator housing includes a plurality of lugs on an annular surface that pass between a corresponding plurality of lugs on a bonnet annular surface. The housing can then rotate until the lugs are axially aligned, in a locked position, thus preventing axial movement of the housing relative to the bonnet. A securing mechanism can then prevent rotational movement of the housing relative to the bonnet so that the housing remains in the locked position. Similarly, a piston head includes a plurality of lugs on an annular surface that pass between a corresponding plurality of lugs on a housing annular surface. The piston head can then rotate until the lugs are axially aligned, in a locked position, thus preventing axial movement of the piston head relative to the housing. A securing mechanism can then prevent rotational movement of the piston head relative to the housing so that the piston head remains in the locked position.

In an embodiment of this disclosure, a system for securing a valve actuator to body of a valve assembly includes an actuator housing having an axis, a valve end, and a plurality of housing lugs spaced apart around a circumference of the actuator housing. The housing lugs protrude radially to define a plurality of housing slots therebetween. The system also has a valve stem. A portion of the valve stem is positioned within the actuator housing, and another portion of the valve stem extends from the valve end of the actuator housing and is operable to be connected to a valve. The valve stem moves axially between an extended position and a retracted position. A bonnet is operable to be connected to the valve. The valve stem passes through the bonnet and is limited in the longitudinal direction by the bonnet. The bonnet has a plurality of bonnet lugs spaced apart around a circumference of the bonnet, the bonnet lugs protruding radially from the bonnet to define a plurality of bonnet slots therebetween. Each of the housing lugs are sized to pass axially through a respective one of the bonnet slots when the actuator housing is in a released position and, after passing through the bonnet slots, the actuator housing is rotatable to a locked position where at least a portion of one or more of the housing lugs is axially aligned with a portion of a respective bonnet lug such that the bonnet lugs prevent axial movement of the actuator housing in at least one direction. The actuator housing rotates less than one full revolution between the released and locked positions. A securing mechanism selectively prevents relative rotation between the actuator housing and the bonnet.

In another embodiment of this disclosure, a system for securing a valve actuator to a body of a valve assembly has an actuator housing having an axis, a valve end, and a plurality of housing lugs spaced apart around a circumference of the actuator housing. The housing lugs protrude radially to define a plurality of housing slots therebetween. The system also includes a valve stem. A portion of the valve stem is positioned within the actuator housing, and another portion of the valve stem extends from the valve end of the actuator housing and is operable to be connected to a valve. The valve stem moves axially between an extended position and a retracted position. A body of the valve assembly is operable to be connected to the actuator housing, the body having a plurality of body lugs spaced apart around a circumference of the body. The body lugs protrude radially from the body to define a plurality of body slots therebetween. Each of the housing lugs are sized to pass axially through a respective one of the body slots when the actuator housing is in a released position and, after passing through the body slots, the actuator housing is rotatable to a locked position where at least a portion of one or more of the housing lugs is axially aligned with a portion of a respective body lug such that the body lugs prevent axial movement of the actuator housing in at least one direction. The housing rotates less than one full revolution between the released and locked positions. A securing mechanism selectively prevents relative rotation between the actuator housing and the body. The valve stem is unsecured in an axial direction within the actuator housing so that the body is separated from the valve stem when the actuator housing is in the released position and the body is removed from the actuator housing.

In yet another embodiment of this disclosure, a method for securing a valve actuator to a body of a valve assembly includes providing an actuator housing having an axis, a valve end, and a plurality of housing lugs spaced apart around a circumference of the actuator housing, the housing lugs protruding radially to define a plurality of housing slots therebetween. A portion of a valve stem is positioned within the actuator housing, and another portion of the valve stem is extended from the valve end of the actuator housing. The valve stem is operable to be connected to a valve and move axially between an extended position and a refracted position. A valve stem is passed through a bonnet that is operable to be connected to the valve, the valve stem limited in the longitudinal direction by the bonnet. The bonnet has a plurality of bonnet lugs spaced apart around a circumference of the bonnet, the bonnet lugs protruding radially from the bonnet to define a plurality of bonnet slots therebetween. Each of the housing lugs are passed axially through a respective one of the bonnet slots so that the actuator housing is in a released position. After passing through the bonnet slots, the actuator housing is rotated to a locked position where at least a portion of one or more of the housing lugs is axially aligned with a portion of a respective bonnet lug such that the bonnet lugs prevent axial movement of the actuator housing in at least one direction. The actuator housing is rotated less than one full revolution between the released and locked positions. A securing mechanism is provided for preventing relative rotation between the actuator housing and the bonnet.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and is therefore not to be considered limiting of its scope as the disclosure may admit to other equally effective embodiments.

FIG. 5 is a sectional view of the connection between the power head and the actuator housing of FIG. 4, taken along the 5-5 line, in accordance with an embodiment of this disclosure.

FIG. 6 is a detail sectional view of the latch assembly of FIG. 5, taken along the 6-6 line.

FIGS. 8A-8D are enlarged perspective views of a latch body having a locking device, in accordance with alternate embodiments of this disclosure.

FIG. 10 is a perspective view of a memory metal detent of FIG. 9, shown in the ambient extended shape.

FIG. 11 is a perspective view of a memory metal detent of FIG. 9, shown in the heated retracted shape.

FIG. 12 is an enlarged view of a quick connect having a securing mechanism with a detent, in accordance with an embodiment of this disclosure.

FIG. 13 is an enlarged view of a quick connect having a securing mechanism with protrusions and recesses, in accordance with an embodiment of this disclosure.

FIG. 14 is an elevation sectional view of a portion of a valve assembly with a securing mechanism having a latch and tab, in accordance with an embodiment of this disclosure.

DETAILED DESCRIPTION OF THE PREFERRED EMBODIMENT

Embodiments of the present disclosure will now be described more fully hereinafter with reference to the accompanying drawings which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments.

Figure 1:
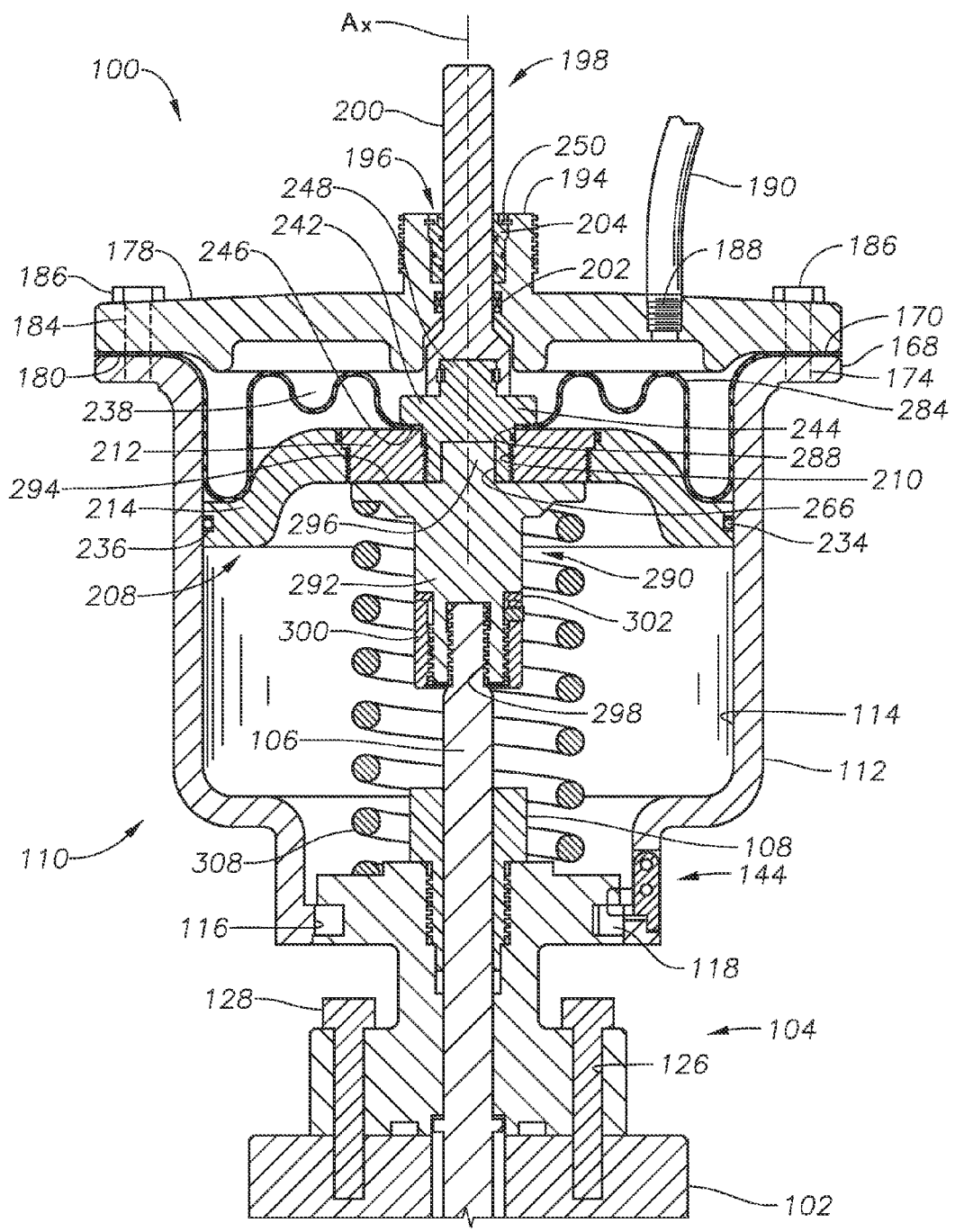
FIG. 1 is a side sectional environmental view of a valve assembly with a valve actuator having a quick connect between the actuator and the bonnet, in accordance with an embodiment of this disclosure.

Referring to FIG. 1, actuator 100 is shown. Actuator 100 is used to open or close valve 102, to which actuator 100 is connected. Valve 102 is connected to fluid containing members, such as tubular members or a vessel, and selectively limits the flow of fluid therethrough. As one of skill in the art will appreciate, valve 102 can be a gate valve or any other type of valve that is actuated by the extension of a linear member. Bonnet 104 is connected to the body of valve 102. Valve stem 106 passes through bonnet 104 and packing retainer 108, with the protruding end of stem 106 being operationally connectable to a member, such as a gate, of valve 102. Valve stem 106 is limited in the longitudinal direction by bonnet 104. Valve stem 106 moves axially between an extended position and a retracted position to actuate valve 102 and move the valve member between the open and closed position. Actuator 100 is used to actuate valve 102 by urging stem 106 downward toward valve 102. Actuator 100, valve 102, bonnet 104, and each of their respective components make up valve assembly 110.

Figure 2:
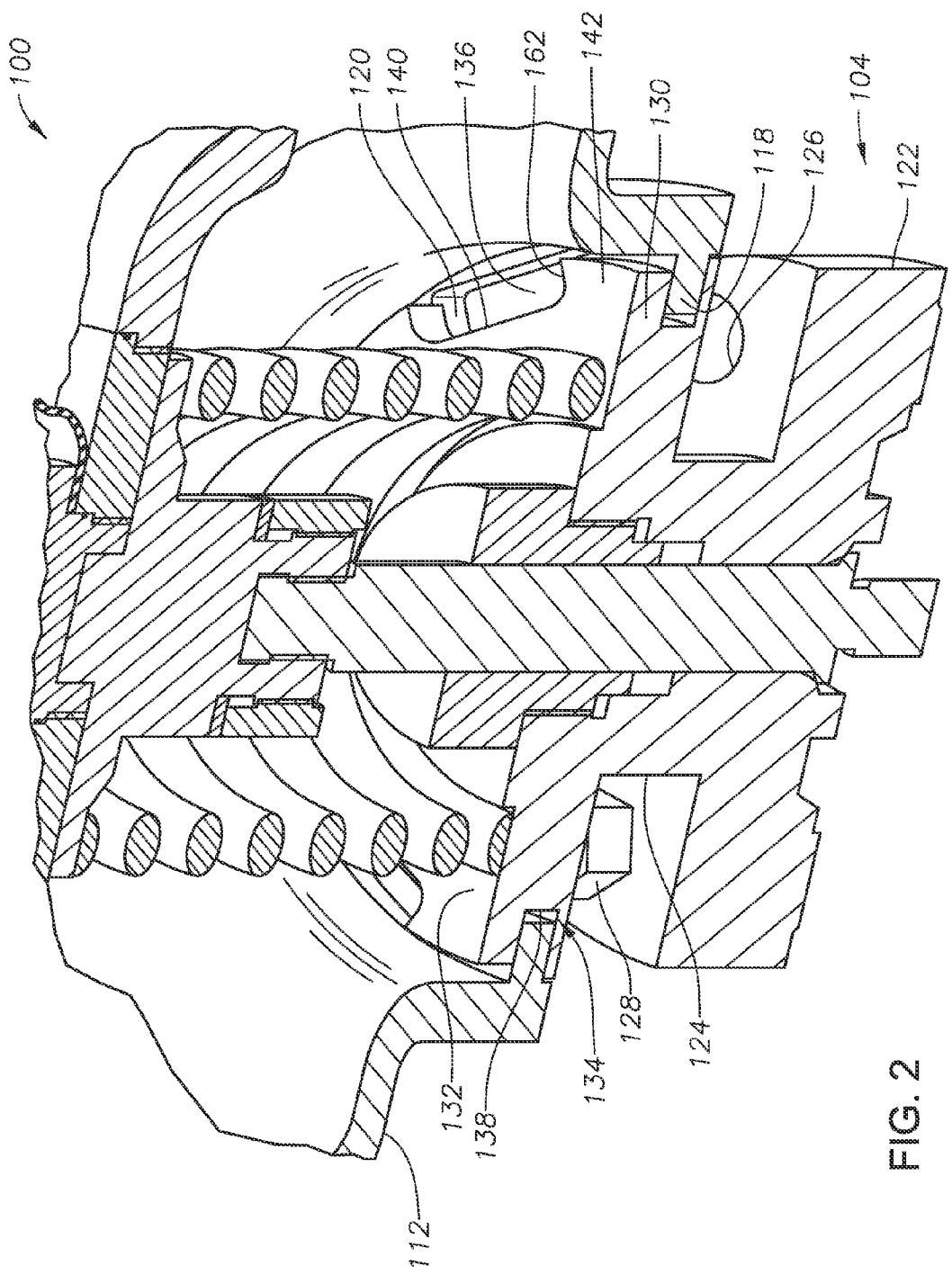
FIG. 2 is an enlarged elevation sectional view of the quick connect of the valve actuator of FIG. 1, in accordance with an embodiment of this disclosure.

Referring to FIGS. 1 and 2, actuator housing 112 includes a cylindrical body having an axis Ax and an inner diameter ("ID") surface 114. Housing 112 is manufactured from any of a variety of techniques including, for example, stamping, extrusion, and casting. In embodiments, housing 112 is free of welds or seams on interior surfaces such as ID surface 114. Housing 112 can be manufactured from NACE certified materials. The lower end of housing 112 can be a valve end of housing 112 and includes an opening defined by inner diameter 116. A portion of valve stem 106 is positioned within housing 112, and another portion of valve stem 106 extends from the valve end of housing 112 and is operable to be connected to valve 102.

A plurality of housing lugs 118 protrude radially inward from ID 116 and are spaced apart around a circumference of ID 116 to define housing slots 120 therebetween. Bonnet 104 and valve 102 prevent the flow of fluid from valve 102 to actuator 100. In other words, there is an absence of fluid communication between valve 102 and actuator 100. In embodiments, actuator housing 112 can be removed from bonnet 104 while fluid is present in valve 102 and no fluid will flow out of valve 102 through bonnet 104 or otherwise.

Bonnet 104 includes lower flange 122 extending radially from bonnet body 124. Lower flange 122 includes bolt holes 126. Bolts 128 pass through bolt holes 126 to connect bonnet 104 to the body of valve 102.

At the opposite end of bonnet 104 from lower flange 122, locking flange 130 extends radially from bonnet body 124 and includes top surface 132. The outer diameter of locking flange 130 is less than or about equal to the inner diameter of ID 116 such that ID 116 can fit over locking flange 130.

Groove 134 is an annular groove in the outer diameter of locking flange 130. The lower sidewall of groove 134 defines upward facing shoulder 136. The width of groove 134, which is defined in terms of axial length along the axis of bonnet 104, is greater than or about equal to the axial length of housing lugs 118. The diameter of groove backwall 138 is less than or about equal to the inner diameter defined by housing lugs 118.

Slots 140 are axial slots in the outer diameter of locking flange 130 that extend from top surface 132 to groove 134. A plurality of slots 140 are spaced apart around the circumference of locking flange 130 to define bonnet lugs 142 therebetween. The radial depth of each slot 140 is typically less than or equal to the radial depth of groove 134, but can be greater than the radial depth of groove 134. Bonnet lugs 142 protrude radially outward from bonnet 104 to define the plurality of bonnet slots 140 therebetween. Each of the housing lugs 118 are sized to pass axially through a respective one of the bonnet slots 140 when housing 112 is in a released position. The circumferential arc length of each slot 140 is approximately equal to or greater than the circumferential arc length of housing lugs 118. Housing lugs 118, thus, are able to pass axially through slots 140. After passing through slots 140, housing lugs 118 are positioned in groove 134 below bonnet lugs 142, but not axially aligned with bonnet lugs 142, in a released position. Housing lugs 118 contact shoulder 136, thus stopping further downward movement of housing 112 relative to bonnet 104. Because housing lugs 118 are axially below bonnet lugs 142, housing 112 can rotate relative to bonnet 104. When housing 112 rotates, relative to bonnet 104, to a position wherein at least a portion of bonnet lugs 142 are axially above housing lugs 118, such that bonnet lugs 142 prevent axial movement of housing 112 in at least one direction, housing 112 is in a locked position. In the locked position, bonnet lugs 142 prevent upward axial movement of housing lugs 118.

In embodiments, less than one revolution of housing 112 is required to move housing 112 from the released to the locked position. In embodiments, housing 112 can move as little as ½, ⅓, ¼, ⅙, ⅛, ⅒, or 1/16, of a revolution, depending on the size and number of lugs, to move from the released to the locked position. As one of skill in the art will appreciate, no fluid from valve 102 is in the vicinity of bonnet lugs 142 and housing lugs 118 and, thus, there can be an absence of seals between the lower end of housing 112 and the upper end of bonnet 104. Therefore, in embodiments, if any fluid is present inside the lower end of housing 112, at least a portion of that fluid can pass through the opening defined by inner diameter 116 and flow to the area outside of housing 102 and outside of bonnet 104.

Figure 3:
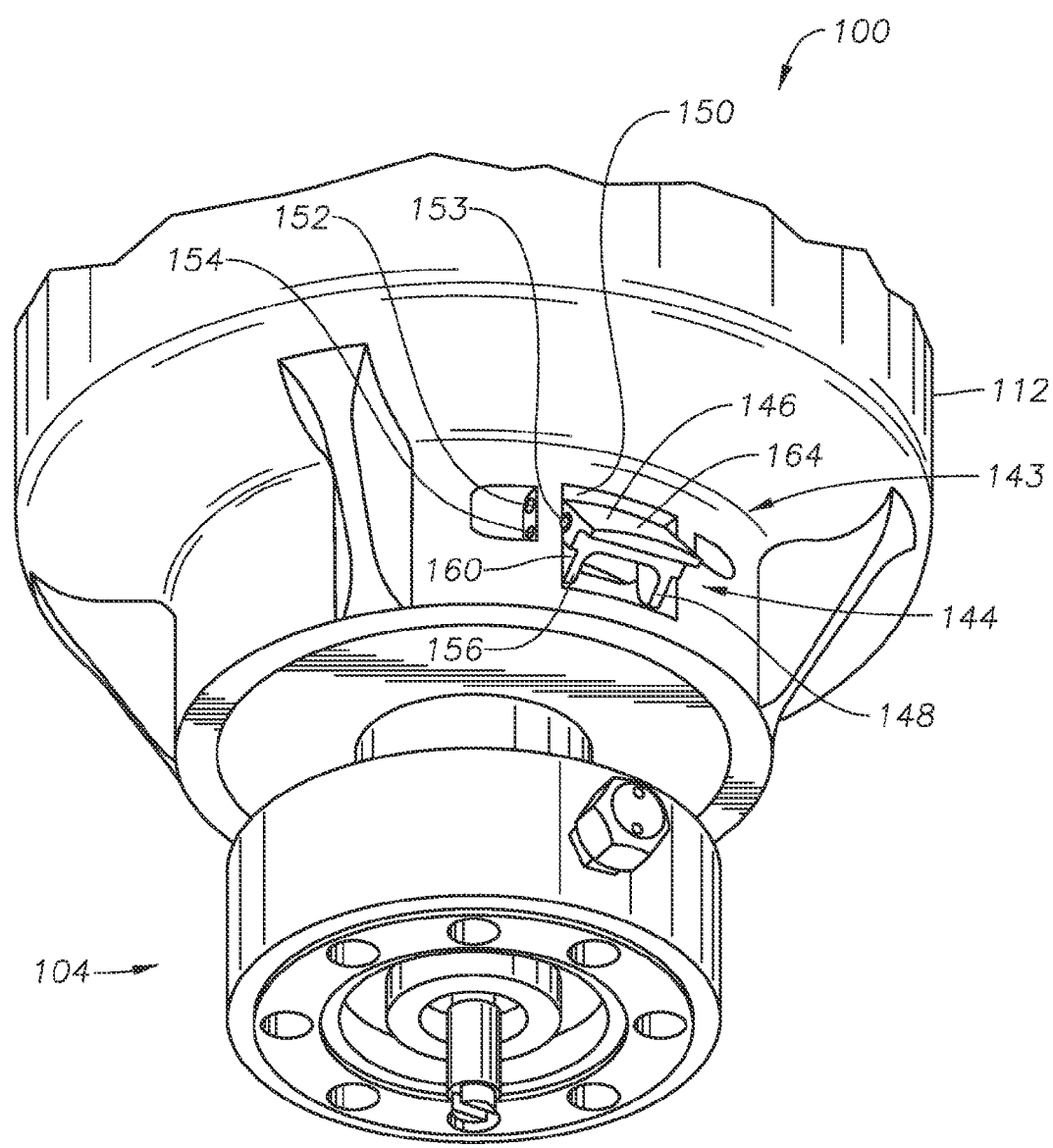
FIG. 3 is an enlarged perspective view of the latch assembly of the valve actuator of FIG. 1.

A securing mechanism 143 can prevent rotation of housing 112, relative to a body member of the valve assembly 110, when housing 112 is in the locked position. In the example of FIG. 3, securing mechanism 143 is a latch assembly with rotational lock 144 that prevent rotation of housing 112, relative to bonnet 104. Rotational lock 144 includes latch body 146 having one or more latch tabs 148 protruding inward therefrom when latch body is positioned in latch aperture 150. Latch aperture 150 is an opening through the sidewall of housing 112. In embodiments, no seals are required at aperture 150 because there is an absence of pressurized fluid in housing 112 proximate to aperture 150. Indeed, in embodiments, there is an absence of seals between aperture 150 and latch body 146. Latch body 146 is pivotally connected to housing 112 by pin 152, which passes through a lateral bore, or cross-drilled hole, of housing 112. Latch body 146 pivots on pin 152 between an unlatched position and a latched position.

Detent 153 is a spring loaded plunger that protrudes from one or both sides of latch body 146. Detent 153 can move between an extended position when a greater amount of detent 153 protrudes from latch body 146 and a retracted position where a lesser amount of detent 153 protrudes from latch body 146. Detent 153 extends from housing 112 and can engage lateral bore 154 of body 112 to selectively prevent latch body 146 from pivoting relative to housing 112 when detent 153 is in the extended position. When detent 153 is in the retracted position, latch body 146 can pivot relative to housing 112 to disengage bonnet 104 and allow for relative rotational movement between bonnet 104 and housing 112. When latch body 146 is pivoted radially outward from housing 112, in the unlatched position, detent 153 contacts an outer diameter surface of housing 112 to prevent latch body 146 from pivoting inward to the latched position. As one of skill in the art will appreciate, other mechanisms can be used to hold latch body 146 in place. Latch tab 148 also includes tab sidewalls 160. Latch tab 148 is positioned in housing 112 slightly above housing lugs 118, such that at least a portion of latch tab 148 is in the same axial location as bonnet lugs 142 when housing 112 is landed on bonnet 104.

In embodiments, a spring (not shown) can bias latch body 146 radially inward. A portion of latch tab 148, such as bottom 156, contacts a top edge (not shown in FIG. 3) of bonnet lug 142 when housing 112 is placed on bonnet 104, thus deflecting latch tab 148 radially outward. An edge of bottom 156 can have a taper to facilitate such deflection.

Referring 2 and 3, with latch tab 148 positioned radially outward from housing 112, in the unlatched position, housing lugs 118 land on shoulder 136 and housing 112 is rotated to the locked position. Detent 153 holds latch tab 148 in the radially outward, unlatched position. An operator then depresses detent 153 to allow latch tab 148 to pivot inward to the latched position. When latch tab 148 pivots to a position where detent 153 is aligned with lateral bore 154, a portion of detent 153 is urged by the internal spring (not shown) into lateral bore 154. In this latched position, detent 153 engages lateral bore 154 to hold latch tab 148 in the latched position and thus prevent latch tab 148 from moving to the unlatched position.

In the latched position, latch tab sidewalls 160 engage the sidewalls 162 of bonnet lugs 142, thus preventing further rotation of housing 112 in either direction relative to bonnet 104. The outer surface 164 of latch tab 148 is contoured with a radius that generally matches the outer diameter profile of housing 112. Other types of rotational lock 144 can be used. For example, a pin (not shown) can be inserted through an aperture (not shown) of housing 112 into a bore (not shown) of bonnet 104. Or a different type of latch mechanism can be used.

At the opposite end of housing 112, from ID 116, is flange 168, which flares outward from housing 112. Flange 168 has an upward facing surface 170, which is a smooth surface for forming a seal. A plurality of bolt holes 174 are spaced part around flange 168. Cap 178 is connected to housing 112. Cap 178 is an annular plate having an outer diameter approximately equal to the outer diameter of flange 168. Sealing surface 180 is a generally smooth, downward facing surface of cap 178 that aligns with upward facing surface 170 of flange 168. A plurality of bolt holes 184 are spaced apart around cap 178 to align with bolt holes 174. Cap bolts 186 are passed through bolt holes 184 to threadingly engage bolt holes 174 to secure cap 178 to housing 112. Other configurations can be used to secure cap 178 to housing 112, such as bolts that are inserted through bolt holes 174 to threadingly engage bolt holes 184, bolts that pass through both members and are secured with nuts (not shown), clamps (not shown), or collars (not shown).

Inlet 188 is an orifice through cap 178 and is spaced inwardly from sealing surface 180. Inlet 188 is connected to a pressurized media fluid source that can selectively provide pressurized media fluid through inlet 188. The pressurized media fluid source includes rigid or flexible tubing or pipe 190. Pressurized media is typically a fluid such as compressed air, nitrogen, well gas, or other types of gas or liquid.

Indicator housing 194 is a housing that includes indicator orifice 196 for receiving indicator stem 198. Indicator stem 198 includes a cylindrical shaft 200 that protrudes through cap 178. Bearing 202 is a bearing surface on an ID of indicator orifice 196 for guiding stem 198. Sealing assembly 204 is a seal that dynamically seals around indicator stem shaft 200. Alternatively, sealing assembly 204 can be a sealing cartridge, a v-shaped lip seal with an o-ring, or other types of seals for dynamically sealing around a shaft.

Plate 208 is an annular plate positioned in housing 112. Plate 208 is generally perpendicular to the axis of housing 112. Plate 208 can span the inner diameter of housing 112 and slidingly or sealingly engage the inner diameter surface of housing 112. Alternatively, plate 208 can span a portion of the inner diameter of housing 112 but not extend to the inner diameter surface. Plate 208 includes a central bore 210. The surface of plate 208 has a contour such that the radially outward portions are axially below the radially inward portions. As shown in FIG. 1, the outer diameter region of the plate is located axially nearer the valve end of the housing than the central portion of the plate. In embodiments, plate 208 has an upward facing convex surface and an upward facing concave surface, with the concave surface being spaced radially outward from the convex surface. Alternatively, plate 208 can have another shape such as, for example, a generally flat shape.

Plate 208 includes hub 212 and outer plate 214. Hub 212 includes central bore 210, having ID threads on an ID surface. Hub 212 also includes a sealing surface on an ID of central bore 210. The outer diameter of hub 212 includes OD threads and an OD sealing surface. Outer plate 214 is an annular ring that connects to hub 212, such that plate 208 includes outer plate 214 and hub 212. The upper surface of outer plate 214 slopes downward and outward, with a generally convex shape, and then extends horizontally to ID surface 114. The ID bore of outer plate 214 includes ID threads for threadingly engaging OD threads of hub 212. A seal is positioned in a seal groove on the bore of outer plate 214, and sealingly engages the OD sealing surface of hub 212. Sidewall seal 234 is positioned in groove 236 located on an outer diameter of outer plate 214, and thus is located on an outer diameter of plate 208. Sidewall seal 234 sealingly engages ID surface 114 of housing 112 to provide a dynamic seal between ID surface 114 and plate 208. In embodiments, a wear ring (not shown in FIG. 1) can be positioned in groove 236. As one of skill in the art will appreciate, a wear ring will reduce the friction between the outer diameter of plate 208 and ID surface 114 of housing 112. The wear ring (not shown in FIG. 1) does not have the same sealing properties as sidewall seal 234.

The space bounded by housing 112, plate 208, and cap 178 is defined as a pressure chamber 238. Fluid introduced through inlet 188 results in an increase in pressure, which causes plate 208 to move downward. Alternatively, a conventional plate, which can have a generally flat shape, and that does not extend to ID surface 114, and a conventional diaphragm can be used.

Coupling 242 is detachably connected to the center of plate 208. Coupling 242 includes a cylindrical body 244, a shoulder 246, and an upper body 248. Body 242 threadingly engages bore 210 of plate 208. Stem 198 is detachably connected to upper body 248 by way of a snap ring 250 that resides in corresponding grooves on each of a bore on the lower end of stem 198 and on the outer diameter of upper body 248. A downward facing cylindrical bore 266 is located in the lower end of body 244. Alternatively, a conventional seal nut (not shown) and stem can be used.

Diaphragm 284 is a flexible diaphragm extending at least from ID surface 114 to coupling 242. As shown in FIG. 1, diaphragm 284 is positioned between sealing surface 180 of cap 178 and surface 170 of flange 168. Bolt hole openings can be spaced apart around diaphragm 284, in alignment with cap bolts 186, so that cap bolts 186 pass through diaphragm 284 when it is positioned between cap 178 and flange 168. Cap bolts 186 are torqued to urge each sealing surface toward diaphragm 284. Diaphragm 284, thus, acts as a seal by sealingly engaging each of the sealing surfaces 180, 170.

An inner diameter orifice 288 is located at the center of diaphragm 284. The lower portion of coupling 242 passes through orifice 288 to engage the threads of central bore 210. The surfaces of diaphragm 284 are positioned between shoulder 246 of coupling 242 and plate 208. As shown in FIG. 1, an upward facing surface of hub 212 sealingly engages a lower surface of diaphragm 284, and shoulder 246 sealingly engages an upper surface of diaphragm 284. As coupling 242 is tightened toward plate 208, diaphragm 284 is compressed between them plate 208 and shoulder 246. When diaphragm 284 is in position, pressure chamber 238 is defined by diaphragm 284 and cap 178.

Down stop 290 is a cylindrical member for transmitting axial force between plate 208 and stem 106. Down stop 290 includes cylindrical body 292 and shoulder 294 extending therefrom. The upward facing surface of shoulder 294 contacts the downward facing surface of plate 208. Nipple 296 extends axially from the upper end of down stop 290. When actuator 100 is assembled, nipple 296 is positioned in bore 266, thus concentrically aligning both members.

The lower end of down stop 290 includes threaded bore 298, which has threads on an ID surface, for threadingly engaging a threaded end of stem 106. As one of skill in the art will appreciate, the connection between down stop 290 and stem 106 can be any of various types of connections and is not limited to threaded connections. The outer diameter of the lower end of down stop 290 includes threaded collar 300 and can include any number of spacer rings 302. Threaded collar 300 contacts another member, such as packing retainer 108, located at the lower end of housing 112, to stop the further downward travel of down stop 290. Threaded collar 300 is adjusted so that it stops downward movement, and thus stem 106, at the appropriate position to completely open or completely close valve 102. Spacer rings 302 can be added or removed so that an opening of the gate (not shown) of gate valve 102 is properly aligned with a passage (not shown) of gate valve 102. A set screw is used to hold threaded collar 300 in position.

Spring 308 surrounds down stop 290 and at least a portion of stem 106, and generally extends from the top of bonnet 104 to the downward facing surface of shoulder 294. Spring 308 is compressed as plate 208 moves from the upper position to the lower position. When fluid pressure from inlet 188 is reduced, spring 308 urges plate 208 up, away from valve 102. As one of skill in the art will appreciate, fluid force within valve 102 can act on stem 106 inside of valve 102 to urge stem 106 upward. Spring 308 and the upward force on the stem 106 can work together or independently to move plate 208 up.

In operation, bonnet 104 is connected to valve 102 by bolts 128. Stem 106 extends upward through packing retainer 108 from bonnet 104. Downstop 290 is threadingly connected to stem 106, and spring 308 is positioned between downstop 290 and bonnet 104 to urge downstop 290 upward. The actuator upper assembly, which includes housing 112, plate 208, diaphragm 284, stem 198, coupling 242, and cap 178, is assembled. The actuator upper assembly is placed on bonnet 104. As the actuator upper assembly is lowered onto bonnet 104, each of the housing lugs 118 pass through a respective slot 140 and then housing lugs 118 land on shoulder 136 of groove 134. Axial movement of housing 112, relative to bonnet 104, is not yet restrained, so housing 112 is in a released position. As the actuator upper assembly, including housing 112, moves downward, latch tab 148 contacts one of the bonnet lugs 142, causing latch tab 148 to pivot radially outward.

When housing lugs 118 land on shoulder 136, latch tab 148 remains in contact with one of the bonnet lugs 142 and remains pivoted outward. The actuator upper assembly is then rotated, relative to bonnet 104, with housing lugs 118 rotating along groove 134, until at least a portion of each housing lug 118 is axially aligned with at least a portion of a respective bonnet lug 142. Upper actuator assembly is thus rotated from the released position to a locked position. Bonnet lugs 142, thus, resist upward movement of housing lugs 118, and shoulder 136 resists downward movement of housing lugs 118, thereby preventing axial movement of the actuator upper assembly relative to bonnet 104. Nipple 296 enters bore 266, and plate 208 lands on downstop 290 as housing 112 lands on bonnet 104.

As housing 112 rotates relative to bonnet 104, latch tab 148 rotates along the bonnet lug 142 with which it is in contact until latch tab 148 is no longer radially aligned with that bonnet lug 142. Once latch tab 148 clears the bonnet lug 142 and detent 153 is depressed, latch tab 148 pivots inward to a latched position. Upon pivoting inward, latch tab 148 is held in the latched position by detent 153 engaging lateral bore 154, and is positioned in a slot 140 between two bonnet lugs 142. Tab sidewalls 160 contact a surface of each of the respective bonnet lugs 142, thus preventing rotation of housing 112 relative to bonnet 104. In embodiments, latch body 146 has an outer surface 164 with a profile that generally matches the outer diameter profile of housing 112 in the vicinity of latch aperture 150. When latch tab 148 is in the latched position, the outer diameter contour of outer surface 164 is generally flush with the outer diameter surface of housing 112 in the vicinity of latch aperture 150.

To remove the actuator upper assembly, a tool (not shown), such as a thin rod or a screwdriver, is inserted into lateral bore 154 and used to depress detent 153, thus urging detent 153 out of lateral bore 154. With detent 153 no longer engaging lateral bore 154, latch body 146 is urged outward, out of the latched position and into an unlatched position, by, for example, engaging a flat tool under the lower edge of latch body. In the unlatched position, latch tab 148 is no longer radially aligned with bonnet lugs 142. The actuator upper assembly, thus, can be rotated, relative to bonnet 104, until housing lugs 118 are axially aligned with bonnet slots 140, at which point the actuator upper assembly can be lifted off of bonnet 104. Housing lugs 118 pass through slots 140 as the actuator upper assembly is removed.

Looking at FIGS. 8A-8E, the securing mechanism can include locking device 500 that retains the securing mechanism in a position that prevent relative movement between housing 112 and the valve body. Locking device 500 can reduce unwanted or unintentional release of housing 112 from the body of valve assembly 110. This can, for example, reduce vandalism and theft associated with valve assemblies as well as decrease environmental and operational risks by adding an additional safeguard against unintentional or undesirable disassembly of valve assembly 110 by an operator.

As an example, locking device 500 can preventing detent 153 from moving from the extended position to the retracted position. This prevents latch body 146 from pivoting relative to housing 112 and therefore housing 112 is prevented from rotating relative to the body of valve assembly 110, such as bonnet 104. Alternately, locking device 500 can more directly prevent latch body 146 from pivoting relative to housing 112 so that detent 153 remains in the extended position and engaged with the body of valve assembly 110. Locking device 500 can be, as an example, a tumbler lock 502 (FIG. 8A), an integrated combination lock 508 (FIG. 8B), a magnetic lock 510 (FIG. 8C), a padlock 516 (FIG. 8D), an external wrap 517 (FIG. 8E) or another known locking type mechanism.

Figure 8A:
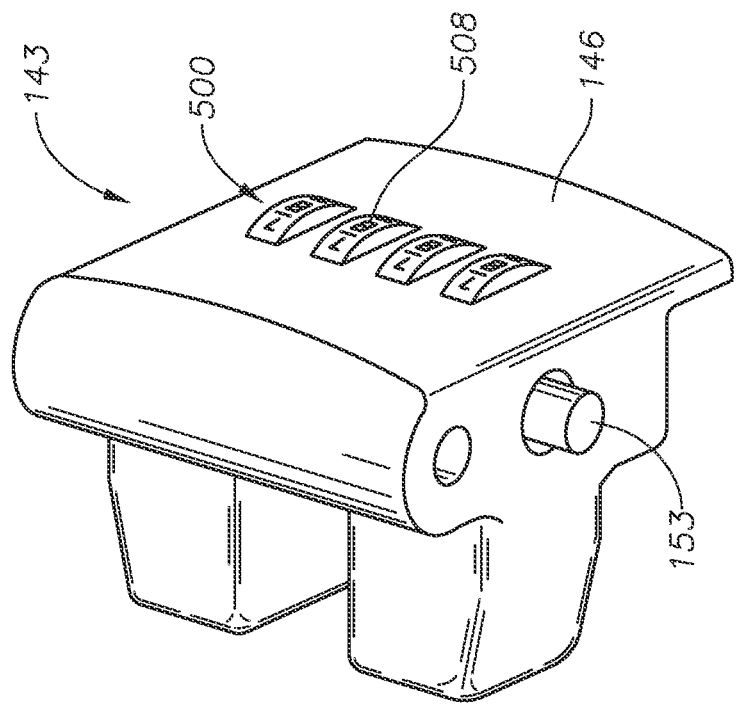

Looking at FIG. 8A, tumbler lock 502 can be an integral part of latch body 146. Tumbler lock 502 can include a rotating portion 504 that rotates with the use of key 506. One end of the rotating portion can be associated with detent 153. As rotating portion 504 rotates, detent 153 is moved between the extended position and the retracted position. Key 506 can lock the position of rotation portion 504 so that detent 153 is retained in either the extended position or the retracted position. Therefore, if detent 153 is in the extended position and engaging the body of valve assembly 110, in order to separate housing 112 from the body of valve assembly 110, a person must have key 506.

Figure 8B:
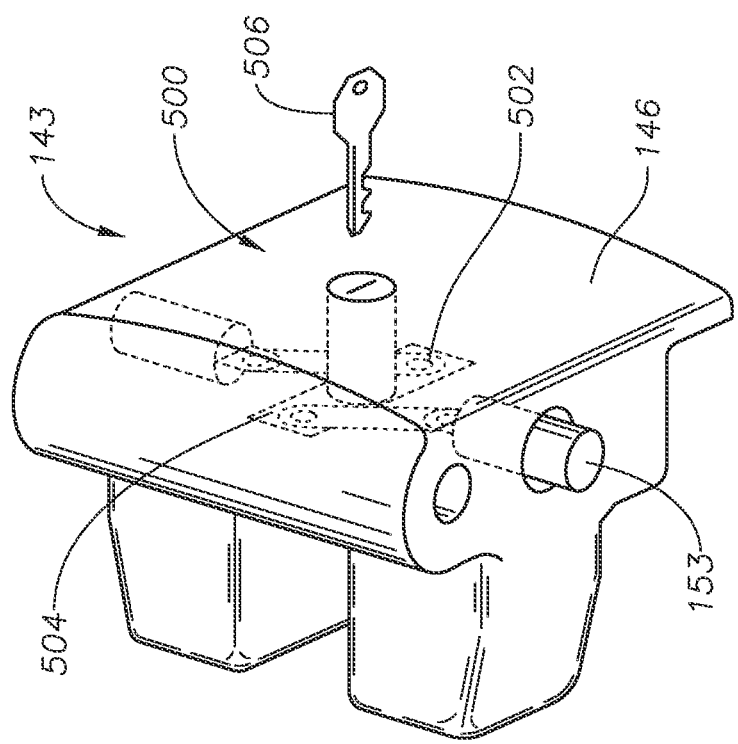
Figure 9:
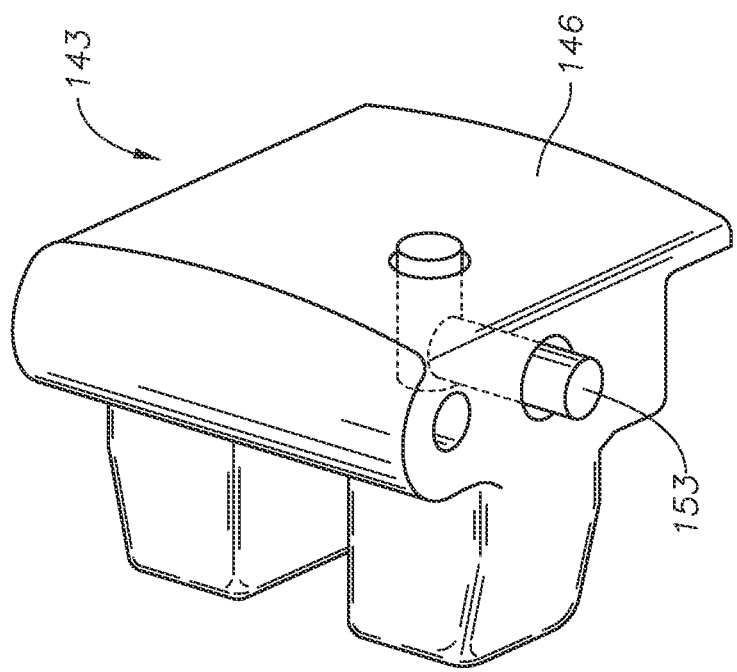
FIG. 9 is an enlarged perspective view of a latch body having a memory metal detent, in accordance with an embodiment of this disclosure.

Looking at FIG. 8B, integrated combination lock 508 can be a part of latch body 146. Combination lock 508 can lock the position of detent 153 so that detent 153 is retained in either the extended position or the retracted position. Therefore, if detent 153 is in the extended position and engaging the body of valve assembly 110, in order to separate housing 112 from the body of valve assembly 110, a person must know the correct combination of combination lock 508.

Looking at FIG. 8C, magnetic lock 510 can include magnetic detent 512 and a corresponding magnetic key 514. Magnetic detent 512 can be biased in an extended position with a biasing member (not shown) such as a spring. In order to move magnetic detent 512 to a retracted position, magnetic key 514 can be inserted into an opening of a face of latch body 146, attracting magnetic detent 512 and pulling magnetic detent 512 to a retracted position. Therefore, if detent 153 is in the extended position and engaging the body of valve assembly 110, in order to separate housing 112 from the body of valve assembly 110, a person must have magnetic key 514 to pull magnetic detent to the retracted position.

Looking at FIG. 8D, padlock 516 can be used to prevent latch body 146 from pivoting relative to the body of valve assembly 110. If detent 153 is in the extended position and engaging the body of valve assembly 110, in order to separate housing 112 from the body of valve assembly 110, a person must first remove padlock 516 before latch body 146 is pivoted to the unlatched position to allow housing 112 to rotate relative to the body of the valve.

Figure 8E:
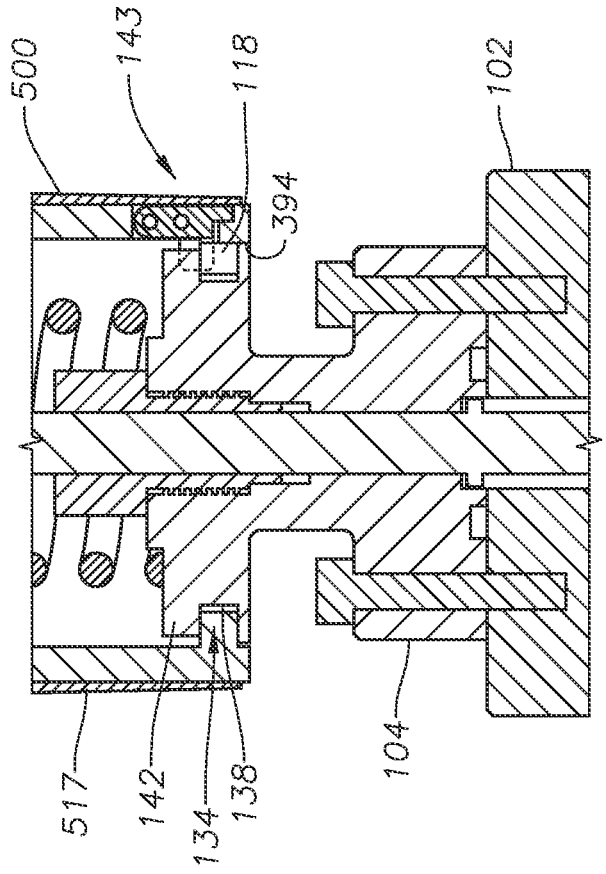
FIG. 8E is a side sectional view of a portion of a valve assembly with a bonnet with an external wrap covering the securing mechanism, in accordance with an embodiment of this disclosure.

Looking at FIG. 8E, external wrap 517 circumscribing the actuator housing and covering the latch assembly.

In alternate embodiments, detent 153 can be formed of a memory metal. When formed of memory metal, detent 153 can take on a relaxed shape at ambient temperature and a second shape when heated above a target temperature. As an example, detent 153 can take on a shape associated with an extended position (FIG. 10) at ambient temperature and can take on a shape associated with a retracted position (FIG. 11) when heated. Therefore, in order to move latch body 146 into engagement with the body of the valve, detent 153 can be heated so that detent 153 moves to a retracted position and latch body 146 can be pivoted to a latched position. As detent 153 returns to ambient pressure and moves to the extended position, it can engage the body of the valve to prevent latch body 146 from pivoting to the unlatched position. If detent 153 is in the extended position and engaging the body of valve assembly 110, in order to separate housing 112 from the body of valve assembly 110, a person must first heat detent 153 to a temperature above the target temperature, so that detent 153 moves to the retracted position, before latch body 146 is pivoted to the unlatched position to allow housing 112 to rotate relative to the body of the valve.

In other alternate embodiment, securing mechanism 143 can include detent 153 that extends directly from housing 112 into the body of valve assembly 110, such as bonnet 104. As an example, in FIG. 12, detent 153 extends from radially through housing 112 and into bonnet 104, so detent 153 can prevent relative rotation between housing 112 and bonnet 104 when detent 153 is in an extended position. Detent 153 extends through a radially oriented hole though housing 112. Detent 153 can have an outer end that protrudes from a radially outer side of the hole and can be grasped by an operator.

Detent 153 permits relative rotation between housing 112 and bonnet 104 when detent 153 is in the retracted position. Biasing spring 518, or other biasing member can urge detent 153 towards an extended position. If detent 153 is in the extended position and engaging the body of valve assembly 110, in order to separate housing 112 from the body of valve assembly 110, a person must retract detent 153, so that detent 153 moves to the retracted position, to allow housing 112 to rotate relative to the body of the valve. Each detent 153 that extends into the body of valve assembly 110 would have to be retracted simultaneously to rotate housing 112 relative to the body of valve assembly 110. A locking device 500 can be used in addition to the detent 153 of the example of FIG. 12 so that an operator would first have to unlock locking device 500 before retracting detent 153.

In the example of FIG. 12, detent 153 is shown extending radially into bores 520 of two consecutive bonnet lugs 142. In embodiments of this disclosure, a detent 153 can extend into each bonnet lug 142. In alternate embodiments, detent 153 could extend into less than each of the bonnet lugs 142, or could extend into a different part of bonnet 104 or into a different body of valve assembly 110.

Looking at FIG. 13, securing mechanism 143 can alternately include one or more upward facing protrusions 522 located on one of the housing lugs 118 and one or more downward facing recesses 524 in one of the bonnet lugs 142. When connecting housing 112 to bonnet 104, upward facing protrusions 522 are aligned with downward facing recesses 524. Upward facing protrusions 522 are located within downward facing recesses 524 when housing 112 is in the locked position, preventing relative rotation between housing 112 and the bonnet 104. When upward facing protrusions 522 are located within downward facing recesses 524, in order to separate housing 112 from the body of valve assembly 110, a person must first separate upward facing protrusions 522 from downward facing recesses 524 to allow housing 112 to rotate relative to the body of the valve. As an example, an operator would first have to push housing 112 axially downward relative to bonnet 104 so that upward facing protrusions 522 are separated from downward facing recesses 524. A locking device 500 can be used in addition to upward facing protrusions 522 and downward facing recesses 524 to prevent separation of upward facing protrusions 522 from downward facing recesses 524, so that an operator would first have to unlock locking device 500 before retracting detent 153.

In alternate embodiments, upward facing protrusions 522 are located on more than one housing lugs and downward facing recesses are located in more than one bonnet lugs 142. In other alternate embodiments, upward facing protrusions 522 can be located on one or more of the bonnet lugs 142 and downward facing recesses 524 can be located on the housing lugs 118.

Figure 15:
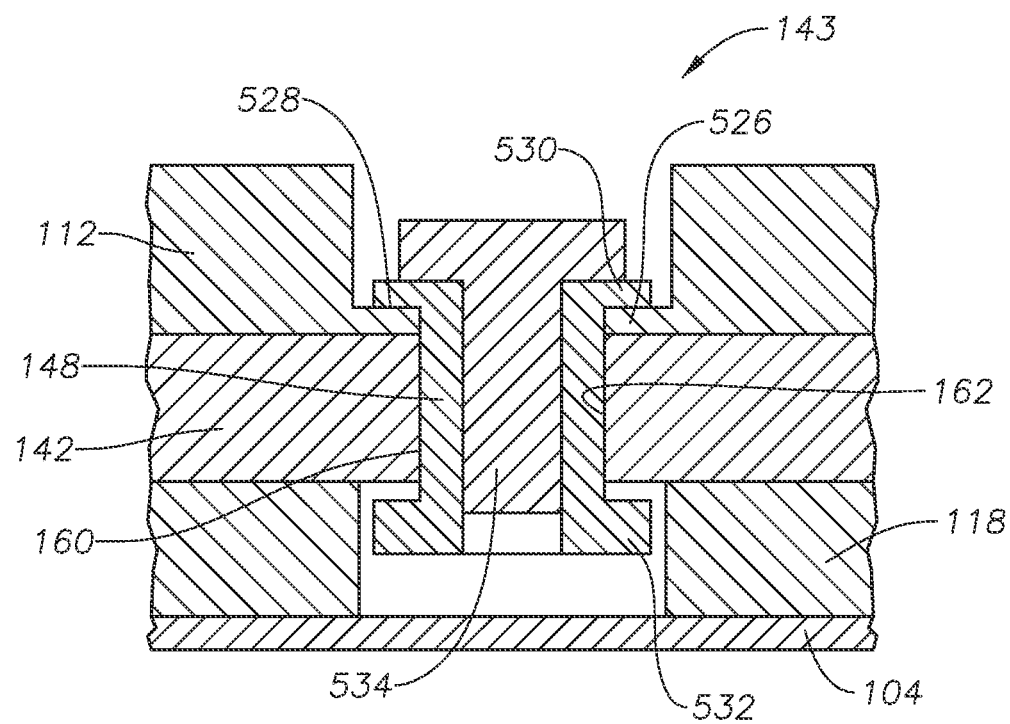
FIG. 15 is a perspective view of a latch and tab assembly of the securing mechanism of FIG. 14.
Figure 16:
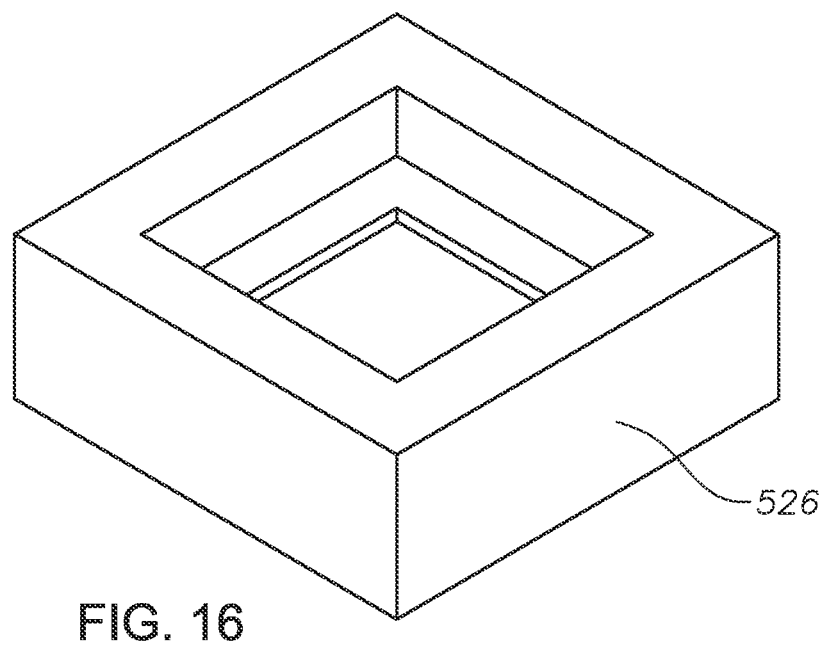
FIG. 16 is a perspective view of a portion of the latch and tab assembly of FIG. 14.

Looking at FIGS. 14-16, securing mechanism 143 can include the latch body in the form of a latch frame 526. Latch frame 526 can be a separate member (FIG. 16), or can be an integral part of housing 112 (FIG. 14). Latch frame 526 will be static relative to housing 112. Latch frame 526 can have an internal upward facing shoulder 528 that supports at least one or, in certain embodiments, two latch tabs 148. Latch tabs 148 have an upper lip 530 and a lower lip 532 forming a generally "C" shape in cross section. After housing 112 has been made up with bonnet 104, latch tabs 148 can pass through a central opening of latch frame 526 and extend into slot 140 between two bonnet lugs 142. Upper lip 530 can rest on shoulder 528 of latch frame 526. Latch tabs 148 can extend generally axially downward from latch frame 526. Latch tabs 148 can then be urged apart from each other so that lower lip 532 extends under a portion of bonnet lugs 142. Wedge 534 is pushed between the two latch tabs 148 so that latch tabs 148 are retained in engagement with bonnet lugs 142. In such a latched position, as shown in FIGS. 14-5, latch tab sidewalls 160 engage the sidewalls 162 of bonnet lugs 142, thus preventing rotation of housing 112 in either direction relative to bonnet 104.

As shown in FIG. 1, inlet 188 is radially offset from the center of cap 178. If tubing 190 is rigid tubing or pipe, or flexible tubing that is less than a certain length, inlet 188 must be aligned with tubing 190 when housing 112 is in the locked position so that tubing 190 can be connected to inlet 188. Housing 112 needs to rotate, at most, the arc length of one lug to move from the released position to the latched position. If there are, for example, eight housing lugs 118 and eight bonnet lugs 142, with eight each housing slots 120 and bonnet slots 140 between them, respectively, the housing rotates approximately $1/16^{th}$ of a turn to move from the released to the locked position. This enables the operator to determine the final position of inlet 188 at the time that housing 112 is placed on bonnet 104. In embodiments, inlet 188 rotates between approximately 1 and 180 degrees when housing 112 is moved between the released and locked position. In embodiments, inlet 188 rotates between approximately 10 and 90 degrees when housing 112 is moved between the released and locked position. In embodiments, inlet 188 rotates between approximately 15 and 45 degrees when housing 112 is moved between the released and locked position. In embodiments, inlet 188 rotates between approximately 22 and 30 degrees when housing 112 is moved between the released and locked position. If latch tab 148 is held in the unlatched position, housing 112 can rotate through one or more locked and unlocked positions and, after releasing latch tab 148, reaching the next locked position and being latched in place.

After housing 112 is connected to bonnet 104, valve 102 is actuated by introducing pressurized media through inlet 188 into pressure chamber 238. The pressurized media exerts downward force on diaphragm 284 and plate 208, which urges plate 208, downstop 290, and stem 106 downward to actuate valve 102. As plate 208 moves downward, coupling 242, being connected to plate 208, also moves downward. Indicator stem 198, being connected to coupling 242, also moves downward. From the exterior of actuator 100, the extension and retraction of stem 198 provides a visual indication of the position of plate 208 and, thus, the state of valve 102.

Figure 4:
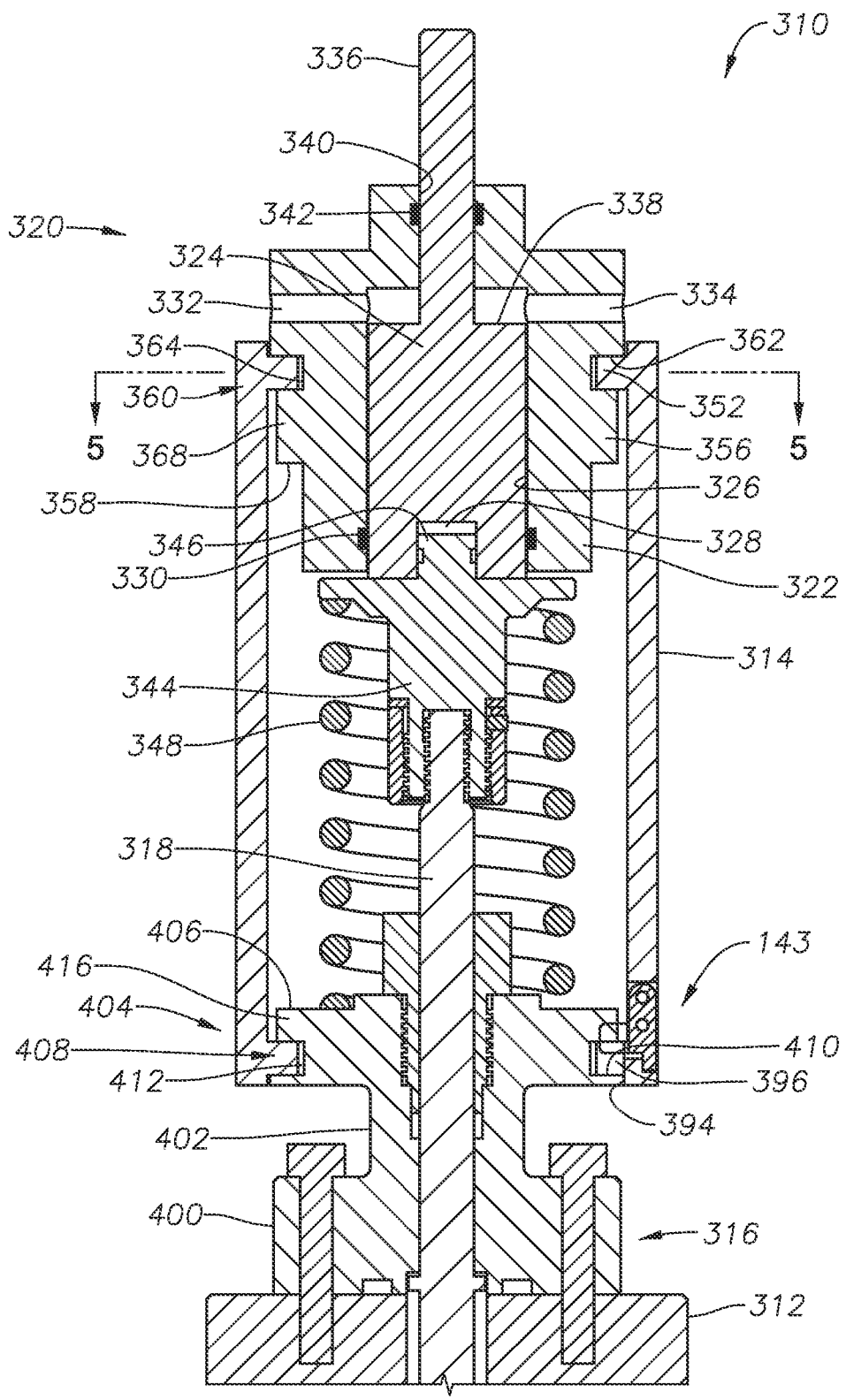
FIG. 4 is an elevation sectional view of a valve with a power head valve actuator and a quick connect between the housing and each of the power head and the bonnet, in accordance with an embodiment of this disclosure.

Referring now to FIG. 4, actuator 310 is a piston type actuator for actuating valve 312. Actuator 310 includes housing 314, which is detachably connected to bonnet 316. Valve stem 318 extends downward through housing 314 and actuates valve 312. Piston head 320, also called a power head, is detachably connected to housing 314. Piston head 320 includes a cylindrical body 322. Piston 324 is positioned within piston chamber 326 of body 322. A cylindrical bore 328 is located in a lower end of piston 324. Seals 330 form a seal between the body of piston 324 and an inner diameter of body 322. Port 332 and port 334 are each apertures through body 322 in communication with piston chamber 326. Port 332 is used to introduce pressurized media into piston chamber 326. Port 334 can be used as an inlet or as an outlet for releasing media from piston chamber 326. Port 334 can be capped, connected to an outlet line, and can include a pressure relief device. Indicator stem 336 extends upward from upward facing surface 338 of piston 324. Indicator stem 336 extends through orifice 340 at the top of body 322. Seal assembly 342 forms a seal between orifice 340 and Indicator stem 336.

Downstop 344 is in contact with a lower surface of piston 324. Nipple 346 extends upward from the center of downstop 344 and is positioned within bore 328 at the base of piston 324. Stem 318 is connected to downstop 344, so that downward movement of piston 324, via downstop 344, urges stem 318 downward. Spring 348 urges downstop 344, and thus stem 318 and piston 324, upward.

Referring to FIGS. 4 and 5, the upper end of housing 314, which can be considered the piston end, includes an opening defined by inner diameter 350. Housing lugs 352 protrude inward from ID 350 and are spaced apart around ID 350 to define slots 354 therebetween. Piston head body 322 includes locking flange 356 extending radially from body 322. The outer diameter of locking flange 356 is less than or about equal to the inner diameter of ID 350 such that ID 350 can fit onto locking flange 356. Flange 356 includes downward facing surface 358.

Groove 360 is an annular groove in the outer diameter of locking flange 356. The upper sidewall of groove 360 defines downward facing shoulder 362. The width of groove 360, which is defined in terms of axial length along the axis of body 322, is greater than or about equal to the axial length of housing lugs 352. The diameter of groove backwall 364 is less than or about equal to the inner diameter of housing lugs 352.

Slots 366 are axial slots on the outer diameter of locking flange 356 that extend from downward facing surface 358 of flange 356 to groove 360. A plurality of slots 366 are spaced apart around the circumference of locking flange 356 to define head lugs 368 therebetween. The radial depth of each slot 366 is typically less than or equal to the radial depth of groove 360, but can be greater than the radial depth of groove 360. The circumferential arc length of each slot is approximately equal to or greater than the circumferential arc length of housing lugs 352. Housing lugs 352, thus, are able to pass axially through slots 366. After passing through slots 366, housing lugs 352 are positioned in groove 360 above head lugs 368. Housing lugs 352 contact shoulder 362, thus stopping further downward movement of body 322 relative to housing 314. Because housing lugs 352 are axially above head lugs 368, piston head 320 can rotate relative to housing 314. When piston head 320 rotates, relative to housing 314, to a position wherein head lugs 368 are axially below housing lugs 352, piston head 320 is in a locked position. In the locked position, housing lugs 352 prevent upward axial movement of head lugs 368.

A rotational lock 370 can prevent rotation of piston head 320, relative to housing 314, when piston head 320 is in the locked position. Rotational lock 370 includes latch body 372 having one or more latch tabs 374 protruding inward therefrom when latch body 372 is positioned in latch aperture 376. Latch aperture 376 being an aperture through the sidewall of housing 314. Latch body 372 is pivotally connected to housing 314 by pin 378 which passes through a lateral bore, or cross-drilled hole, of housing 314. Latch body 372 pivots on pin 378 between a latched position and an unlatched position. Detent 379 is a spring loaded plunger that protrudes from one or both sides of latch body 372. Detent 379 engages a lateral bore (not shown) of housing 314 to selectively prevent latch body 372 from pivoting relative to housing 314. When latch body 372 is pivoted radially outward from housing 314, in the unlatched position, detent 379 contacts an outer diameter surface of housing 314 to prevent latch body 372 from pivoting inward to the latched position. Latch tab 374 also includes tab sidewalls 386. Latch tab 374 is positioned in housing 314 slightly above housing lugs 352, such that at least a portion of latch tab 374 is in the same axial location as head lugs 368.

Referring now to FIG. 6, in embodiments, latch tab 374 includes a tapered top 382 that faces upward and inward when latch tab 374 is positioned in latch aperture 376. Tapered top 382 contacts a bottom edge 384 of head lug 368 when piston head 320 is placed on housing 314, thus deflecting latch tab 374 radially outward.

Referring back to FIGS. 4 and 5, when shoulder 362 lands on housing lugs 352 and housing 314 is rotated to the locked position, latch tab 374 clears the head lug 368 with which it is radially located, latch tab 374 being held in the unlatched position by detent 379 contacting an outer diameter surface of housing 314. An operator then depresses detent 379 to allow latch tab 374 to pivot inward to the latched position. Once in the latched position, detent 379 is urged into lateral bore (not shown) of housing 314 by a spring (not shown). In the latched position, latch tab sidewalls 386 engage the sidewalls 390 of head lugs 368, thus preventing further rotation of piston head 320 in either direction relative to housing 314. The outer surface of rotational lock 370 is contoured with a radius that generally matches the outer diameter profile of housing 314.

Other types of rotational lock 370 can be used. For example, a pin (not shown) can be inserted through an aperture (not shown) of housing 314 into a radial bore (not shown) of piston head 320. Or a different type of latch mechanism can be used.

Figure 7:
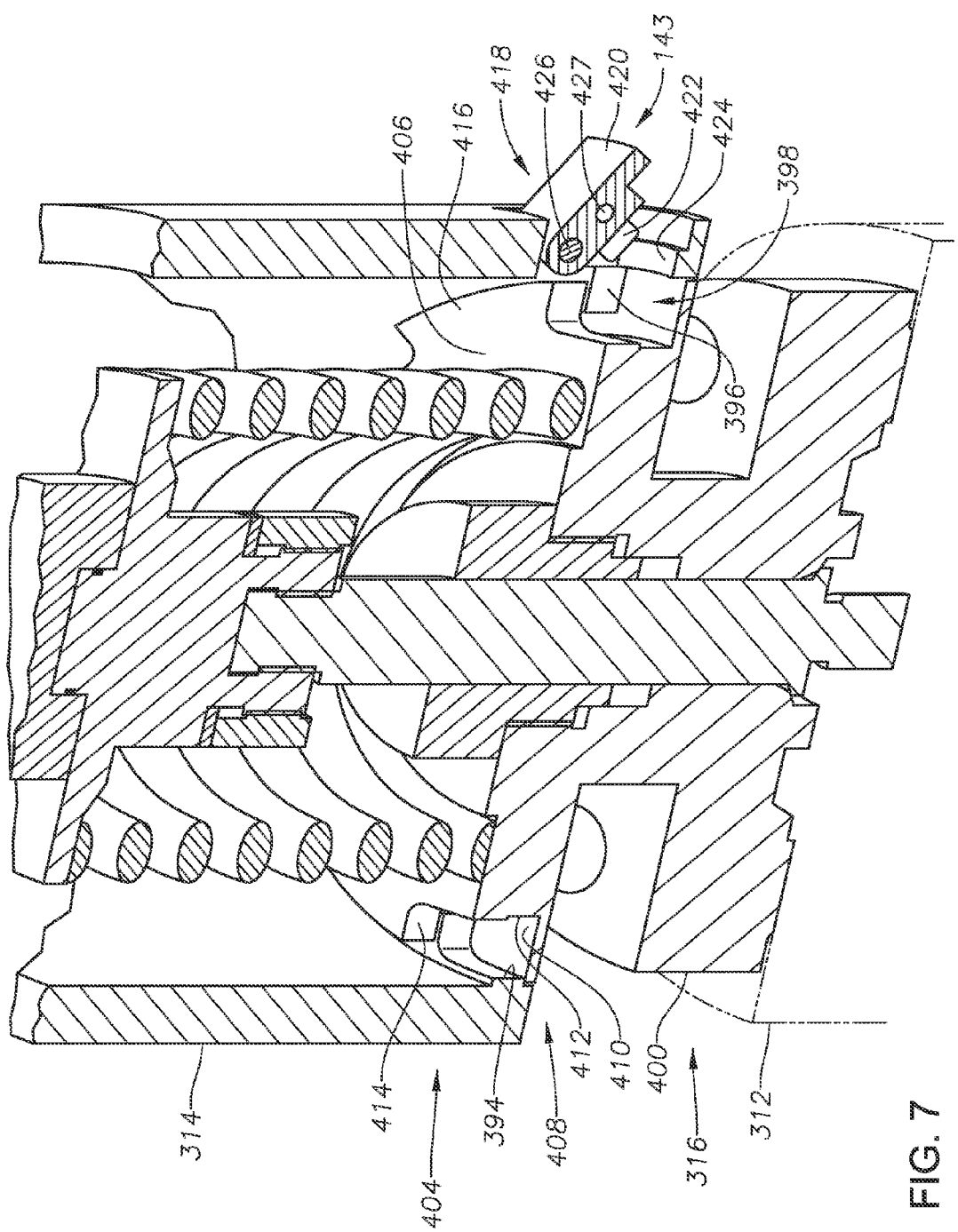
FIG. 7 is an enlarged sectional view of the quick connect between the actuator and the bonnet, of FIG. 4.

FIGS. 4 and 7 show a quick connect type of connection between housing 314 and bonnet 316. Other types of housing-to-bonnet connections can be used with the quick disconnect piston head 320. The lower end of housing 314, which can be considered the valve end, includes an opening defined by inner diameter 394. Housing lugs 396 protrude inward from ID 394 and are spaced apart around ID 394 to define slots 398 therebetween. Bonnet 316 includes lower flange 400 extending radially from bonnet body 402. Lower flange 400 is connected to the body of valve 312 by, for example, bolts (not shown in FIG. 4). At the opposite end of bonnet 316 from lower flange 400, locking flange 404 extends radially from bonnet body 402 and includes top surface 406. The outer diameter of locking flange 404 is less than or about equal to the inner diameter of ID 394 such that ID 394 can fit over locking flange 404.

Groove 408 is an annular groove in the outer diameter of locking flange 404. The lower sidewall of groove 408 defines upward facing shoulder 410. The width of groove 408, which is defined in terms of axial length along the axis of bonnet 316, is greater than or about equal to the axial length of housing lugs 396. The diameter of groove backwall 412 is less than or about equal to the inner diameter of housing lugs 396.

Slots 414 are axial slots in the outer diameter of locking flange 404 that extend from top surface 406 to groove 408. A plurality of slots 414 are spaced apart around the circumference of locking flange 404 to define bonnet lugs 416 therebetween. The radial depth of each slot 414 is typically less than or equal to the radial depth of groove 408, but can be greater than the radial depth of groove 408. The circumferential arc length of each slot is approximately equal to or more than the circumferential arc length of housing lugs 396. Housing lugs 396, thus, are able to pass axially through slots 414. After passing through slots 414, housing lugs 396 are positioned in groove 408 below bonnet lugs 416. Housing lugs 396 contact shoulder 410, thus stopping further downward movement of housing 314 relative to bonnet 316. Because housing lugs 396 are axially below bonnet lugs 416, housing 314 can rotate relative to bonnet 316. When housing 314 rotates, relative to bonnet 316, to a position wherein bonnet lugs 416 are axially above housing lugs 396, housing 314 is in a locked position. In the locked position, bonnet lugs 416 prevent upward axial movement of housing lugs 396.

A rotational lock 418 can prevent rotation of housing 314, relative to bonnet 316, when housing 314 is in the locked position. Rotational lock 418 includes latch body 420 having latch tab 422 protruding inward therefrom when latch body is positioned in latch aperture 424. Latch body 420 is pivotally connected to housing 314 by pin 426. Latch body 420 pivots on pin 426 between an unlatched position and a latched position. A detent 427 engages a lateral bore of housing 314 (not shown in FIG. 7) to hold latch tab 422 in the latched position.

Latch tab 422 can include a tapered bottom that faces downward and inward when latch tab 422 is positioned in latch aperture 424. The tapered bottom can contacts the top edge of bonnet lug 416 when housing 314 is placed on bonnet 316, thus deflecting latch tab 422 radially outward. Latch tab 422 is positioned in housing 314 slightly above housing lugs 396, such that at least a portion of latch tab 422 is in the same axial location as bonnet lugs 416.

When housing lugs 396 land on shoulder 410 and housing 314 is rotated to the locked position, latch tab 422 is released by depressing detent 427, and latch tab 422 can then move into a latched position wherein at least a portion of latch tab 422 is in slot 414. Detent 427 can engage lateral bore (not shown) to hold latch tab 422 in the latched position. In the latched position, latch tab sidewalls engage the sidewalls of housing lugs 396, thus preventing further rotation of housing 314 in either direction relative to bonnet 316. The outer surface of latch body 420 is contoured with a radius that generally matches the outer diameter profile of housing 314.

Other types of rotational lock 418 can be used. For example, a pin (not shown) can be inserted through an aperture (not shown) of housing 314 into a bore (not shown) of bonnet 316. Or a different type of latch mechanism can be used.

In embodiments, the ends of housing 314 are interchangeable such that housing 314 can be reversed during installation. In other words, the opening diameters, lug sizes, slot sizes, and other functional parts used to connect to each of piston head 320 and bonnet 316 are substantially identical. In embodiments, the valve end of housing 314 and the piston end of housing 314 are substantially similar so that each of the valve end and the piston end are operable to be connected to one of the piston head and the bonnet.

In addition, in embodiments, securing mechanism 143 and locking device 500 as described above for use with the connection between housing 112 and bonnet 104 could each be made part of the connection between housing 314 and bonnet 316 or housing 314 and piston head 320.

While embodiments of the disclosure have been shown or described in only some of its forms, it should be apparent to those skilled in the art that it is not so limited, but is susceptible to various changes without departing from the scope of the disclosure.

What is claimed is:

1. A system for securing a valve actuator to body of a valve assembly, the system comprising:
   an actuator housing having an axis, a valve end, and a plurality of housing lugs spaced apart around a circumference of the actuator housing, the housing lugs protruding radially to define a plurality of housing slots therebetween;
   a valve stem, a portion of the valve stem being positioned within the actuator housing, and another portion of the valve stem extending from the valve end of the actuator housing and operable to be connected to a valve, the valve stem moving axially between an extended position and a retracted position;
   a bonnet operable to be connected to the valve, the valve stem passing through the bonnet and limited in an axial direction by the bonnet, the bonnet having a plurality of bonnet lugs spaced apart around a circumference of the bonnet, the bonnet lugs protruding radially from the bonnet to define a plurality of bonnet slots therebetween, wherein each of the housing lugs are sized to pass axially through a respective one of the bonnet slots when the actuator housing is in a released position and, after passing through the bonnet slots, the actuator housing being rotatable to a locked position where at least a portion of one or more of the housing lugs is axially aligned with a portion of a respective bonnet lug such that the bonnet lugs prevent axial movement of the actuator housing in at least one direction, the actuator housing rotating less than one full revolution between the released and locked positions, and the actuator housing maintaining a sealed pressure chamber in the released position and when detached from the bonnet; and a securing mechanism selectively preventing relative rotation between the actuator housing and the bonnet.

2. The system according to claim 1, wherein the securing mechanism includes a latch assembly having a latch body connected to one of the actuator housing and the bonnet, the latch body being positionable in one of the slots and engaging one or more of the lugs in the locked position to prevent relative rotation between the actuator housing and the bonnet.

3. The system according to claim 2, wherein the latch body is positioned in an aperture of the actuator housing, the latch body being pivotable between a latched position and an unlatched position, the latch body having a contour matching an outer diameter contour of the actuator housing in the vicinity of the aperture so that the latch body is substantially flush with the outer diameter contour in the latched position.

4. The system according to claim 2, wherein the latch body includes an internal shoulder supporting two latch tabs, the latch assembly further having a wedge that is pushed between the latch tabs, retaining the latch tabs in engagement with the lugs.

5. The system according to claim 2, further comprising an external wrap circumscribing the actuator housing and covering the latch assembly.

6. The system according to claim 1, wherein the securing mechanism incudes a detent that selectively extends from the actuator housing into the bonnet to prevent relative rotation between the actuator housing and the bonnet when the detent is in an extended position, the detent permitting relative rotation between the actuator housing and the bonnet when the detent is in a retracted position.

7. The system according to claim 6, further comprising locking device selectively preventing the detent from moving from the extended position to the retracted position.

8. The system according to claim 7, wherein the locking device is selected from a group consisting of an integrated combination lock, a padlock, a tumbler lock, and a magnetic lock.

9. The system according to claim 6, wherein the detent is formed of memory metal, the detent being in the extended position at ambient temperature and the retracted position when heated.

10. The system according to claim 6, wherein the detent extends from a latch assembly having a latch body connected to one of the actuator housing and the bonnet, the latch body being positionable in one of the slots and engaging one or more of the lugs in the locked position.

11. The system according to claim 6, wherein the detent extends through a radially oriented hole though the actuator housing, the detent having an outer end that protrudes from a radially outer side of the hole and being biased in a radially inward direction to selectively engage a bore of the bonnet.

12. The system according to claim 1, wherein the securing mechanism includes an upward facing protrusion on one of the housing lugs and a downward facing recess in one of the bonnet lugs, the upward facing protrusion located within the downward facing recess when the actuator housing is in the locked position, preventing relative rotation between the actuator housing and the bonnet.

13. A system for securing a valve actuator to a body of a valve assembly, the system comprising:

an actuator housing having an axis, a valve end, and a plurality of housing lugs spaced apart around a circumference of the actuator housing, the housing lugs protruding radially to define a plurality of housing slots therebetween;

a valve stem, a portion of the valve stem being positioned within the actuator housing, and another portion of the valve stem extending from the valve end of the actuator housing and operable to be connected to a valve, the valve stem moving axially between an extended position and a refracted position;

a body of the valve assembly operable to be connected to the actuator housing, the body having a plurality of body lugs spaced apart around a circumference of the body, the body lugs protruding radially from the body to define a plurality of body slots therebetween, wherein each of the housing lugs are sized to pass axially through a respective one of the body slots when the actuator housing is in a released position and, after passing through the body slots, the actuator housing being rotatable to a locked position where at least a portion of one or more of the housing lugs is axially aligned with a portion of a respective body lug such that the body lugs prevent axial movement of the actuator housing in at least one direction, the actuator housing rotating less than one full revolution between the released and locked positions, and the actuator housing maintaining a sealed pressure chamber in the released position and when detached from the body; and a securing mechanism selectively preventing relative rotation between the actuator housing and the body; wherein the valve stem is unsecured in an axial direction within the actuator housing so that the body is separated from the valve stem when the actuator housing is in the released position and the body is removed from the actuator housing.

14. The system according to claim 13, wherein the securing mechanism includes a latch assembly having a latch body connected to one of the actuator housing and the body, the latch body being positionable in one of the slots and engaging one or more of the lugs in the locked position to prevent relative rotation between the actuator housing and the body.

15. The system according to claim 14, further comprising an external wrap circumscribing the actuator housing and covering the latch assembly.

16. The system according to claim 13, wherein the securing mechanism incudes a detent that selectively extends from the actuator housing into the body to prevent relative rotation between the actuator housing and the body when the detent is in an extended position, the detent permitting relative rotation between the actuator housing and the body when the detent is in a retracted position.

17. The system according to claim 16, further comprising locking device selectively preventing the detent from moving from the extended position to the retracted position.

18. The system according to claim 16, wherein the detent is formed of memory metal, the detent being in the extended position at ambient temperature and in the retracted position when heated.

19. The system according to claim 13, wherein the securing mechanism includes an upward facing protrusion on one of the housing lugs and a downward facing recess in one of the body lugs, the upward facing protrusion located within the downward facing recess when the actuator housing is in the locked position, preventing relative rotation between the actuator housing and the body.

20. A method for securing a valve actuator to a body of a valve assembly, the method comprising:
   providing an actuator housing having an axis, a valve end, and a plurality of housing lugs spaced apart around a circumference of the actuator housing, the housing lugs protruding radially to define a plurality of housing slots therebetween;
   positioning a portion of a valve stem being within the actuator housing, and extending another portion of the valve stem from the valve end of the actuator housing, the valve stem operable to be connected to a valve and moving axially between an extended position and a retracted position;
   passing the valve stem through a bonnet that is operable to be connected to the valve, the valve stem limited in an axial by the bonnet, the bonnet having a plurality of bonnet lugs spaced apart around a circumference of the bonnet, the bonnet lugs protruding radially from the bonnet to define a plurality of bonnet slots therebetween;
   passing each of the housing lugs axially through a respective one of the bonnet slots so that the actuator housing is in a released position and, after passing through the bonnet slots, rotating the actuator housing to a locked position where at least a portion of one or more of the housing lugs is axially aligned with a portion of a respective bonnet lug such that the bonnet lugs prevent axial movement of the actuator housing in at least one direction, the actuator housing rotating less than one full revolution between the released and locked positions, and the actuator housing maintaining a sealed pressure chamber in the released position and when detached from the bonnet; and
   providing a securing mechanism for preventing relative rotation between the actuator housing and the bonnet.

21. The method according to claim 20, wherein the securing mechanism includes a latch assembly having a latch body connected to one of the actuator housing and the bonnet, and wherein the method further comprises positioning the latch body in one of the slots and engaging one or more of the lugs in the locked position to prevent relative rotation between the actuator housing and the bonnet.

22. The method according to claim 21, further comprising circumscribing the actuator housing and covering the latch assembly with an external wrap.

23. The method according to claim 20, wherein the securing mechanism incudes a detent, the method further comprising extending the detent from the actuator housing into the bonnet to prevent relative rotation between the actuator housing and the bonnet when the detent is in an extended position, the detent permitting relative rotation between the actuator housing and the bonnet when the detent is in a refracted position.

24. The method according to claim 23, further comprising preventing the detent from moving from the extended position to the retracted position with a locking device.

25. The method according to claim 23, wherein the detent is formed of memory metal, the detent being in an extended position at ambient temperature and the retracted position when heated.

26. The method according to claim 20, wherein the securing mechanism includes an upward facing protrusion on one of the housing lugs and a downward facing recess in one of the bonnet lugs, the method further comprising locating the upward facing protrusion within the downward facing recess when the actuator housing is in the locked position, preventing relative rotation between the actuator housing and the bonnet.

* * * * *